United States Patent [19]

Hashimoto

[11] Patent Number: 4,708,921

[45] Date of Patent: Nov. 24, 1987

[54] PHOTOSENSITIVE MATERIAL CONTAINING DISAZO COMPOUND FOR USE IN ELECTROPHOTOGRAPHY

[75] Inventor: Mitsuru Hashimoto, Numazu, Japan

[73] Assignee: Ricoh Co., Ltd., Tokyo, Japan

[21] Appl. No.: 821,099

[22] Filed: Jan. 21, 1986

[30] Foreign Application Priority Data

Apr. 18, 1985 [JP] Japan ................................. 60-83379

[51] Int. Cl.$^4$ ............................................. G03G 5/06
[52] U.S. Cl. ...................................... 430/70; 430/72; 430/74; 430/76; 534/564
[58] Field of Search ...................... 430/70, 72, 76, 74; 534/564, 809, 816

[56] References Cited

U.S. PATENT DOCUMENTS 4,486,522  12/1984  Hashimoto .................... 430/58 X Primary Examiner—J. David Welsh
Attorney, Agent, or Firm—Flynn, Thiel, Boutell & Tanis

[57] ABSTRACT

The present invention relates to a photosensitive material for use in electrophotography, characterized by having a photosensitive layer containing a disazo pigment having the following general formula (I),

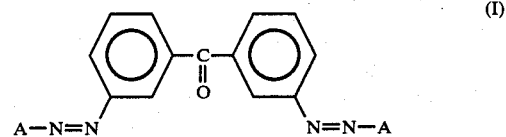

wherein A represents a coupler residue.

7 Claims, 13 Drawing Figures

PHOTOSENSITIVE MATERIAL CONTAINING DISAZO COMPOUND FOR USE IN ELECTROPHOTOGRAPHY

BACKGROUND OF THE INVENTION

1. Field of the Invention

This invention relates to a photosensitive material useful in electrophotography which contains a disazo compound as the effective component, particularly, an electrophotographic photosensitive material having a photosensitive layer containing said disazo compound as a material which generates electric charge when irradiated with light (hereinafter referred to as a "charge-generating material").

This invention further relates to a novel disazo compound used for said photosensitive material, a method for preparing said disazo compound, and a novel tetrazonium salt compound used for preparing said disazo compound.

2. Description of the Prior Art

Heretofore, typically known photosensitive materials included inorganic type photosensitive materials that used selenium and its alloy or a dispersion of zinc oxide sensitized by coloring matter in a binder resin, and organic type photosensitive materials that used a charge transfer complex of 2,4,7-trinitro-9-fluorenone (hereinafter referred to as "TNF") and poly-N-vinylcarbazole (hereinafter referred to as "PVK").

However, these conventional photosensitive materials have not only advantages but also various disadvantages. For example, the selenium type photosensitive material widely used at present has such disadvantages as the manufacturing cost is high due to the severity of the manufacturing conditions; it is difficult to work the material into a belt-like product because of lack of flexibility; and it is difficult to handle because the material is sensitive to heat and mechanical shock. The zinc oxide type photosensitive material can be manufactured at low expense by coating cheap zinc oxide on a substrate, but it has such disadvantages as low sensitivity; the smoothness of the surface, hardness, tensile strength, friction resistance and other mechanical properties are inferior; and the durability for repeated use in a plain paper copier is poor. The photosensitive material using the charge transfer complex of TNF and PVK has a low sensitivity and is unsuitable as a photosensitive material for a high speed copier.

Recently, various studies have been carried out to remove disadvantages of these photosensitive materials, and many photosensitive materials, particularly organic type photosensitive materials, have been proposed. Among them, a laminated type photosensitive material prepared by forming a thin film of an organic pigment on an electro-conductive substrate (charge generating layer) and overlaying a charge transfer material-containing layer (charge transfer layer) on said charge generating layer generally has higher sensitivity and more stable chargeability than the conventional organic type photosensitive materials, and it is practically used in part as a photosensitive material for a plain paper copier.

Examples of this kind of known conventional laminated type photosensitive materials include as follows:
(1) photosensitive material using a thin layer formed by vapor depositing perylene derivatives as a charge transfer layer (see U.S. Pat. No. 3,871,882);
(2) photosensitive material using a thin layer formed by coating an organic amine solution of Chloro Dian Blue as a charge generating layer and hydrazone compound as a charge transfer layer (see Japanese Patent Publication No. 55-42380);
(3) photosensitive material using a thin layer formed by coating an organic solvent dispersion of a distyryl benzene type disazo compound as a charge generating layer and a hydrazone compound as a charge transfer layer (see Japanese Patent Laid Open No. 55-84943); and the like.

However, these conventional laminated type photosensitive materials have not only advantages but also various disadvantages as mentioned below.
(1) The above photosensitive materials using perylene derivatives and oxadiazole derivatives has a disadvantage in that the manufacturing cost is very high because the charge generating layer is formed by vapor deposition.
(2) The above photosensitive material using Chloro Dian Blue and hydrazone compound must also use an organic amine (for example, ethylene diamine) as a coating solvent for forming a charge generating layer which is difficult to handle. Furthermore, it has a disadvantage in that the image reproducibility of a reddish original is poor because the photosensitive wavelength range of the visible light zone lies in the range of about 450–660 nm. Therefore, it is necessary to provide a filter to cut red light when used in a copier, thus being disadvantageous to the design of a copier.
(3) The above photosensitive materials using distyryl benzene type disazo compound and hydrazone compound have an advantage in that the charge generating layer can easily be prepared by coating a dispersion of the disazo compound, but it also has a disadvantage in that the image reproducibility of a reddish original is poor in the same manner as in the above photosensitive material (2) since the photosensitive wave length lies in the range of about 450–700 nm.

In addition to these disazo compounds, other examples of known disazo compounds include benzidine type disazo compounds disclosed in Japanese Patent Laid Open Nos. 47-37543 and 52-55643, stilbene type disazo compounds disclosed in Japanese Patent Laid Open No. 52-8832, and the like. However, the conventional layered type photosensitive materials using these disazo compounds also have the same disadvantages as mentioned above, their sensitivity is low and the image reproducibility of a reddish original is poor because the photosensitive wavelength range of the visible light zone lies in the range of about 450–700 nm.

SUMMARY OF THE INVENTION

An object of the present invention is to provide a novel photosensitive material which does not have the above mentioned conventional disadvantages.

That is, an object of the present invention is to provide a novel disazo compound useful for a photosensitive material for use in electrophotography, particularly the above mentioned layered type photosensitive material. As compared with an electrophotographic element containing the conventional disazo compound, the laminated type electrophotographic element containing said disazo compound of the present invention has a higher sensitivity and the photosensitive wavelength zone of the electrophotographic element of the present invention resides in a shorter wavelength side of the visible light zone (about 450–600 nm), thus having an excellent image reproducibility of a reddish original.

Thus, the present invention resides in a photosensitive material for use in electrophotography, characterized by having a photosensitive layer containing a disazo pigment having the following general formula (I),

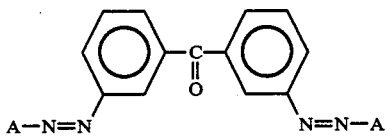

(I)

(wherein A represents a coupler residue).

The present invention further resides in a novel disazo compound useful as a charge generating material for said photosensitive material, said disazo compound having the following general formula (I)',

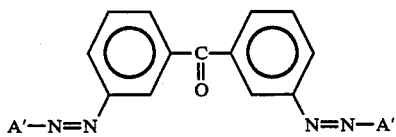

(I)' wherein A' represents

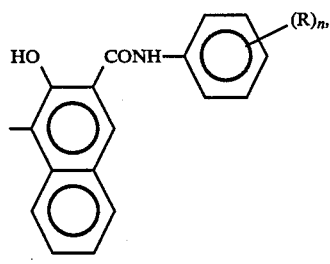

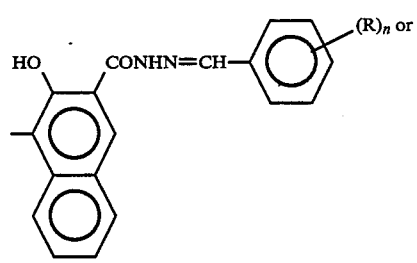

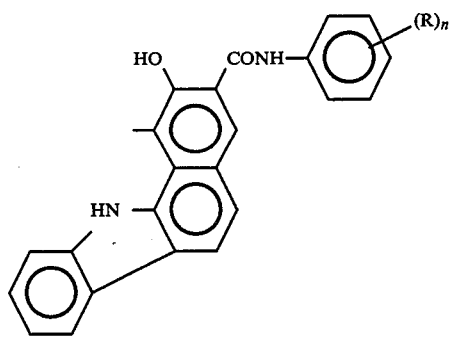

(wherein R represents an alkyl such as methyl, ethyl, propyl, butyl or the like, alkoxy, nitro, halogen, cyano or halomethyl group; n represents an integer of 0, 1, 2 or 3; and R may be the same or different when n is an integer of 2 or 3).

The present invention still further resides in a novel tetrazonium salt compound used for preparing said novel disazo compound, said tetrazonium salt compound having the following general formula (II),

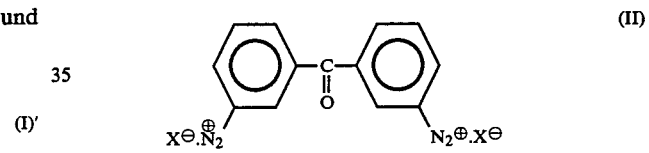

(II)

wherein X represents an anion functional group.

The present invention still further resides in a method for preparing said novel disazo compound having the general formula (I)',

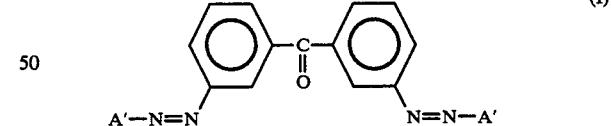

(I)' wherein A' represents

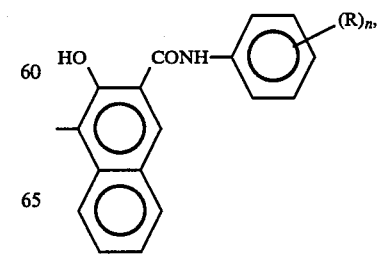

-continued

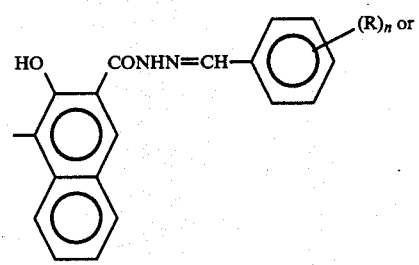

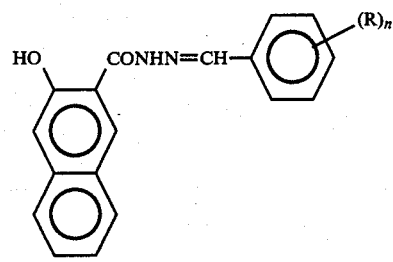

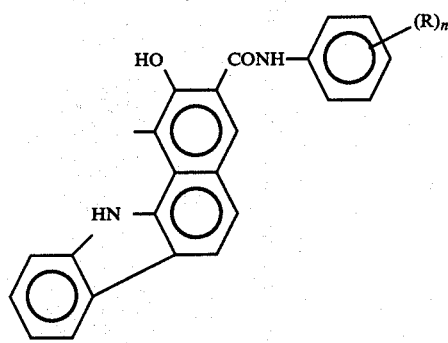

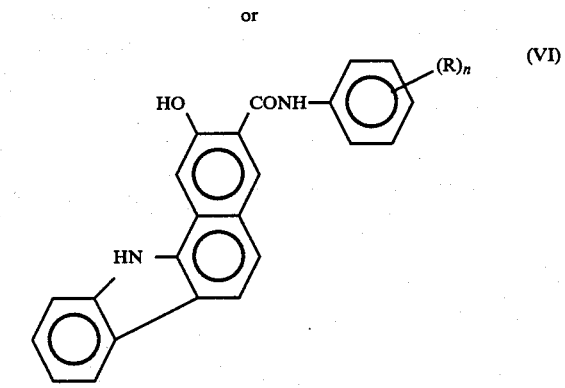

(wherein R represents an alkyl, alkoxy, nitro, halogen, cyano or halomethyl group; n represents an integer of 0, 1, 2 or 3; and R may be the same or different when n is an integer of 2 or 3), characterized by comprising diazotizing a diamino compound having the formula (III),

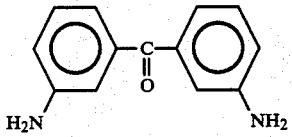
(III)

to prepare a tetrazonium salt having the general formula (II),

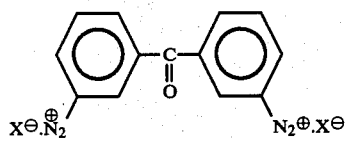
(II)

(wherein X represents an anion functional group), and reacting the tetrazonium salt thus prepared with a compound (hereinafter referred to as a coupler) having the following general formula (IV), (V) or (VI),

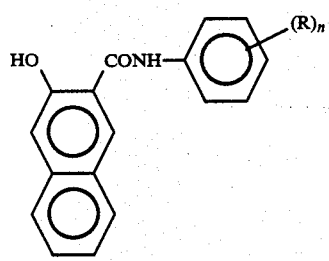
(IV)

(wherein R and n are the same as defined above).

DETAILED DESCRIPTION OF THE PRESENT INVENTION

Figure 1:
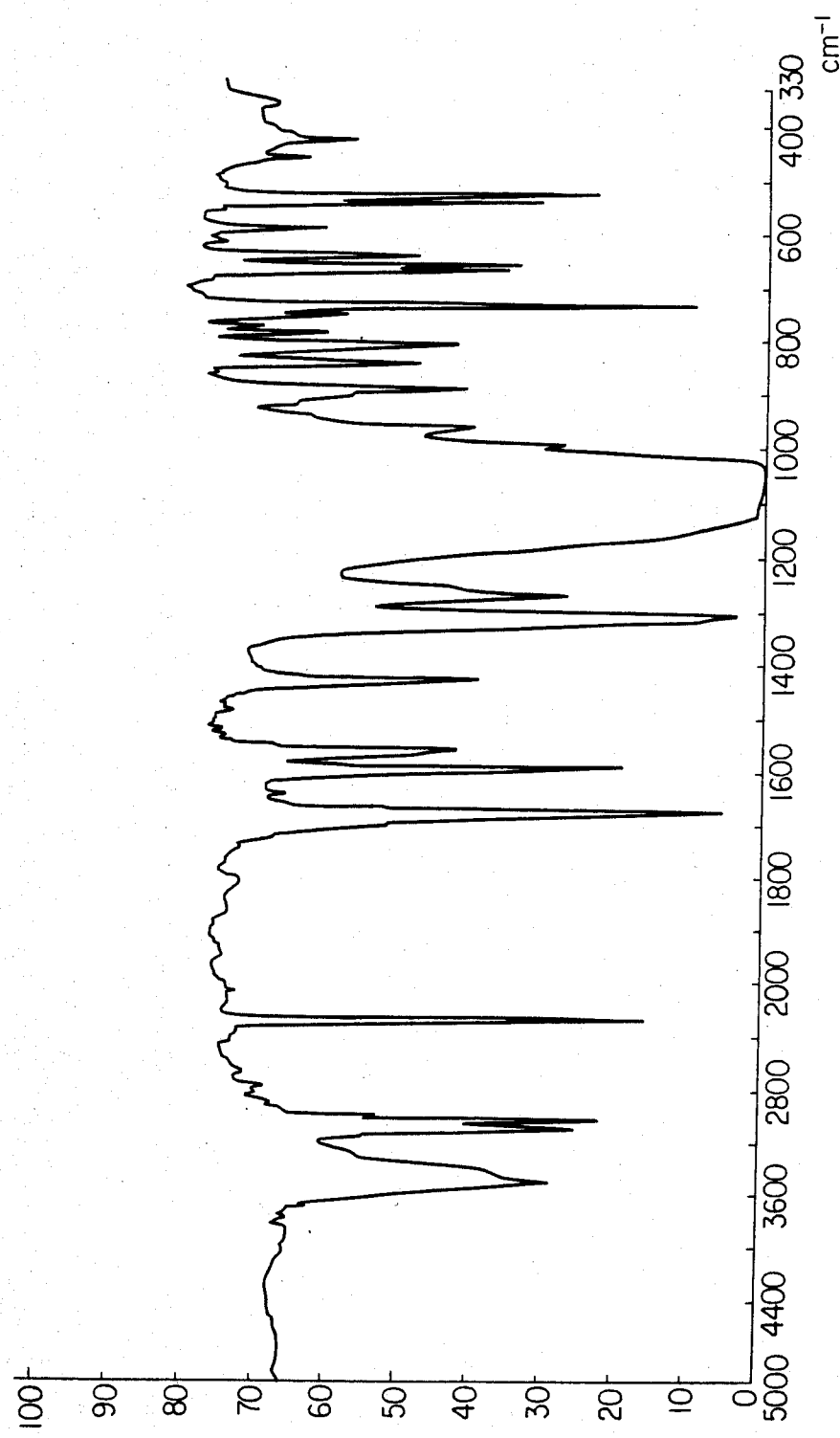
FIG. 1 shows an infrared absorption spectrum (KBr tablet method) of the tetrazonium salt compound of Preparation Example 1.

Applicant has searched for a photosensitive material having a high sensitivity for use in electrophotography which could be easily prepared and have a photosensitive wave length zone residing in such a shorter wave length zone as to be suitable for reproducing an image of a reddish original. As the result of this search, applicant has found that the above mentioned object can be achieved by using the specific disazo compound having the above general formula (I) or (I)' of the present invention as a charge generating material.

Examples of a coupler used for preparing the disazo compound expressed by the general formula (I) or (I)' include an aromatic hydrocarbon compound and heterocyclic compound having a phenolic hydroxyl group such as phenol type, naphthol type compounds and the like; an aromatic hydrocarbon compound and heterocyclic compound having an amino group; an aromatic hydrocarbon compound and heterocyclic compound having an amino group and a phenolic hydroxyl group such as aminonaphthols; a compound having an aliphatic or aromatic enol type ketone group (compound having an active methylene group) and the like. Preferably, the coupler residue A of the general formula (I) is expressed by the following general formula (VII), (VIII), (IX), (X), (XI), (XII), (XIII), (XIV), (XV), (XVI), (XVII), (XVIII) or (XIX).

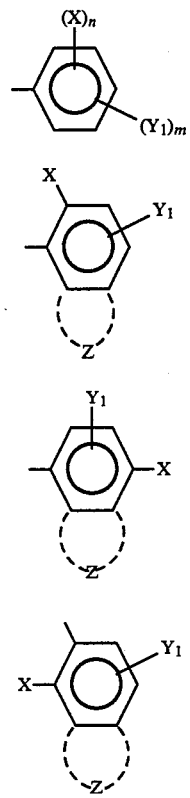

(VII)

(VIII)

(IX)

(X)

wherein X, Y₁, Z, m and n in the above formula (VII), (VIII), (IX) and (X) represent the following groups:

$$X: \quad -OH, \; -\underset{R_2}{\overset{|}{N}}-R_1 \; \text{or} \; -NHSO_2-R_3$$

(wherein R₁ and R₂ represent hydrogen or a substituted or non-substituted alkyl group, and R₃ represents a substituted or non-substituted alkyl or a substituted or non-substituted aryl group);

Y₁: hydrogen, halogen, substituted or non-substituted alkyl group, substituted or non-substituted alkoxy group, carboxyl group, sulfo group, substituted or non-substituted sulfamoyl group or

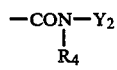

(wherein R₄ represents hydrogen, alkyl group or its substituted group, phenyl group or its substituted group, and Y₂ represents cyclic hydrocarbon group or its substituted group, heterocyclic group or its substituted group, or

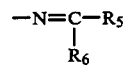

wherein R₅ represents a cyclic hydrocarbon group or its substituted group, heterocyclic group or its substituted group, or styryl group or its substituted group, and R₆ represents hydrogen, alkyl group, phenyl group or their substituted group, or R₅ and R₆ may form a ring with carbons bonded thereto);

Z: cyclic hydrocarbon group or its substituted group, or heterocyclic group or its substituted group;

n: an integer of 1 or 2; and m: an integer of 1 or 2.

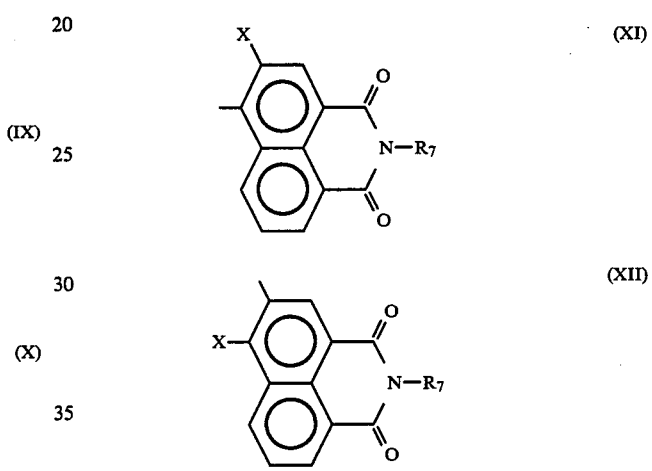

wherein R₇ in the above formula (XI) and (XII) represents a substituted or non-substituted hydrocarbonyl group, and X is the same as mentioned above.

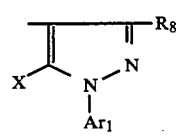

wherein R₈ represents an alkyl group, carbamoyl group, carboxyl group or its ester, and Ar₁ represents a cyclic hydrocarbon group or its substituted group, and X is the same as mentioned above.

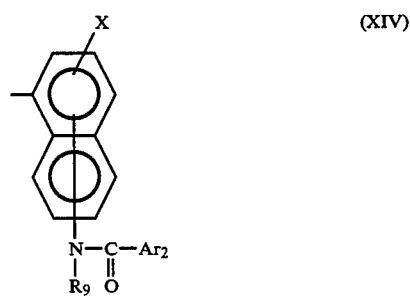

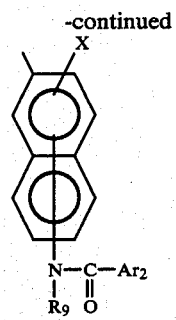

(XV)

wherein R9 in the above formula (XIV) and (XV) represents hydrogen or substituted or non-substituted hydrocarbonyl group, and Ar2 represents cyclic hydrocarbon group or its substituted group.

Examples of the cyclic hydrocarbon expressed by Z in the above general formula (VII), (VIII), (IX) or (X) include benzene ring, naphthalene ring and the like, and examples of the heterocycle expressed by the same Z include indole ring, carbazole ring, benzofuran ring and the like. Examples of the substituent of the ring expressed by Z include a halogen atom such as chlorine, bromine, and the like, and an alkoxy group, and the like.

Examples of the cyclic hydrocarbon group expressed by Y2 or R5 include phenyl, naphthyl, anthryl, pyrenyl and the like, and examples of the heterocyclic group expressed by the same Y2 or R5 include pyridyl, thienyl, furyl, indolyl, benzofuranyl, carbazolyl, dibenzofuranyl and the like. Examples of the ring formed by bonding R5 and R6 include fluorene ring.

Examples of the substituents for the cyclic hydrocarbon group or heterocyclic group expressed by Y2 or R5 or for the ring formed by bonding R5 and R6 include an alkyl group such as methyl, ethyl, propyl, butyl or the like; an alkoxy group such as methoxy, ethoxy, propoxy, butoxy or the like; a halogen atom such as chlorine, bromine or the like; a dialkyl amino group such as dimethyl amino, diethyl amino or the like; a diaralkyl amino group such as dibenzyl amino or the like; a halomethyl group such trifluoromethyl or the like; nitro group; cyano group; carboxyl group or its ester; hydroxyl group; sulphonate group such as —SO3Na; and the like.

Examples of the substituent for the phenyl group expressed by R4 include a halogen atom such as chlorine or bromine.

Examples of the hydrocarbonyl group expressed by R7 or R9 include an alkyl group such as methyl, ethyl, propyl, butyl and the like; an aralkyl group such as benzyl and the like; an aryl group such as phenyl; or their substituted groups.

Examples of the substituent for the hydrocarbonyl group expressed by R7 or R9 include an alkyl group such as methyl, ethyl, propyl, butyl and the like; an alkoxy group such as methoxy, ethoxy, propoxy, butoxy and the like; a halogen atom such as chlorine, bromine and the like; hydroxyl group; nitro group; and the like.

Examples of the cyclic hydrocarbon group expressed by Ar1 or Ar2 include phenyl, naphthyl and the like, and examples of the substituents for these groups include an alkyl group such as methyl, ethyl, propyl, butyl or the like; an alkoxy group such as methoxy, ethoxy, propoxy, butoxy or the like; nitro group; a halogen group such as chlorine, bromine or the like; cyano group; and a dialkyl amino group such as dimethyl amino, diethyl amino or the like.

Among the groups expressed by X, a hydroxyl group is particularly suitable.

Among the above coupler residues, preferable ones are expressed by the general formula (VIII), (XI), (XII), (XIII), (XIV) and (XV), and X in the above general formulas is preferably a hydroxyl group.

Among them, the coupler residue expressed by the general formula (XVI),

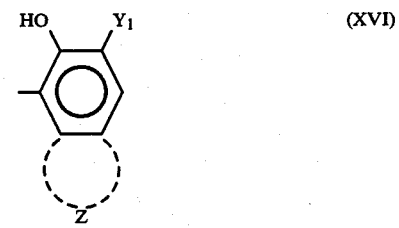

(XVI)

(wherein Y1 and Z are the same as mentioned above) is preferable, and the coupler residue expressed by the general formula (XVII),

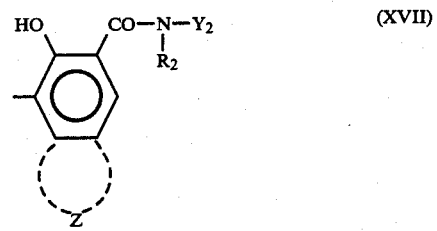

(XVII)

(wherein Z, Y2 and R2 are the same as mentioned above) is more preferable.

A more preferable coupler residue among the above mentioned groups is expressed by the general formula (XVIII) or (XIX),

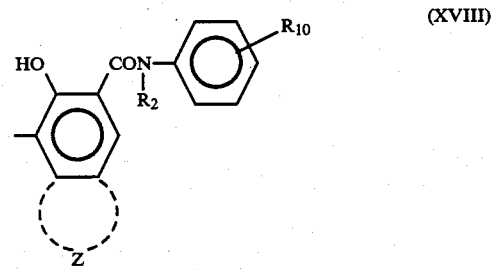

(XVIII)

-continued

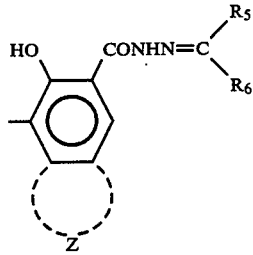
(XIX)

(wherein Z, R$_2$, R$_5$ and R$_6$ are the same as mentioned above, and R$_{10}$ is the same as those illustrated with regard to the substituents for Y$_2$).

The most preferable coupler residue is expressed by the following general formula.

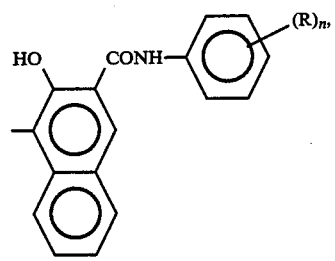

-continued

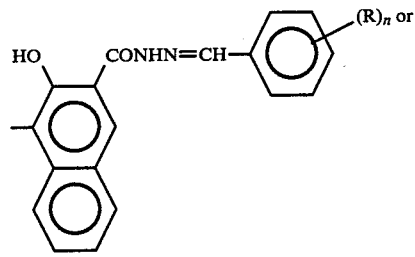

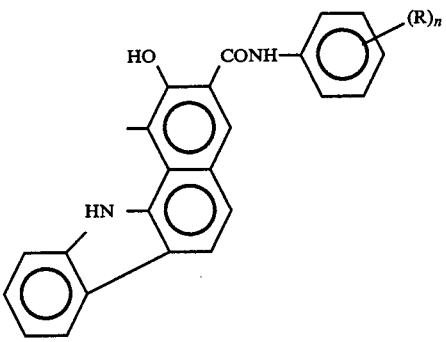

(wherein R represents an alkyl such as methyl, ethyl, propyl, butyl or the like, alkoxy, nitro, halogen, cyano or halomethyl group; n represents an integer of 0, 1, 2 or 3; and R may be the same or different when n is an integer of 2 or 3).

Examples of the disazo compound used in the present invention are illustrated by the following structural formulas.

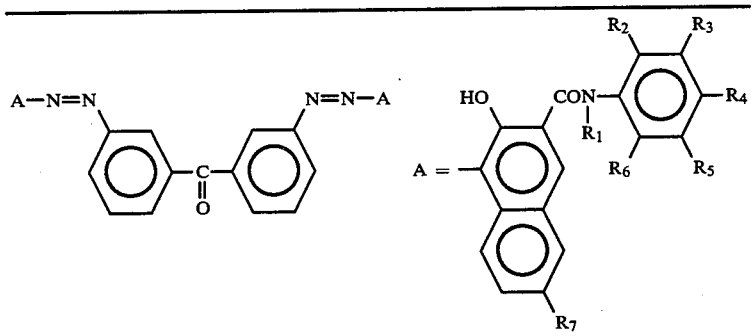

| Disazo Compound No. | R$_1$ | R$_2$ | R$_3$ | R$_4$ | R$_5$ | R$_6$ | R$_7$ |
|---|---|---|---|---|---|---|---|
| 1 | H | H | H | H | H | H | H |
| 2 | H | NO$_2$ | H | H | H | H | H |
| 3 | H | H | NO$_2$ | H | H | H | H |
| 4 | H | H | H | NO$_2$ | H | H | H |
| 5 | H | CF$_3$ | H | H | H | H | H |
| 6 | H | H | CF$_3$ | H | H | H | H |
| 7 | H | H | H | CF$_3$ | H | H | H |
| 8 | H | CN | H | H | H | H | H |
| 9 | H | H | CN | H | H | H | H |
| 10 | H | H | H | CN | H | H | H |
| 11 | H | I | H | H | H | H | H |
| 12 | H | H | I | H | H | H | H |
| 13 | H | H | H | I | H | H | H |
| 14 | H | Br | H | H | H | H | H |
| 15 | H | H | Br | H | H | H | H |
| 16 | H | H | H | Br | H | H | H |
| 17 | H | Cl | H | H | H | H | H |
| 18 | H | H | Cl | H | H | H | H |

-continued

| | | | | | | | |
|---|---|---|---|---|---|---|---|
| 19 | H | H | H | Cl | H | H | H |
| 20 | H | F | H | H | H | H | H |
| 21 | H | H | F | H | H | H | H |
| 22 | H | H | H | F | H | H | H |
| 23 | H | CH$_3$ | H | H | H | H | H |
| 24 | H | H | CH$_3$ | H | H | H | H |
| 25 | H | H | H | CH$_3$ | H | H | H |
| 26 | H | C$_2$H$_5$ | H | H | H | H | H |
| 27 | H | H | H | C$_2$H$_5$ | H | H | H |
| 28 | H | OCH$_3$ | H | H | H | H | H |
| 29 | H | H | OCH$_3$ | H | H | H | H |
| 30 | H | H | H | OCH$_3$ | H | H | H |
| 31 | H | OC$_2$H$_5$ | H | H | H | H | H |
| 32 | H | H | OC$_2$H$_5$ | H | H | H | H |
| 33 | H | H | H | OC$_2$H$_5$ | H | H | H |
| 34 | H | H | H | N(CH$_3$)$_2$ | H | H | H |
| 35 | CH$_3$ | H | H | H | H | H | H |
| 36 | C$_6$H$_5$ | H | H | H | H | H | H |
| 37 | H | OCH$_3$ | H | H | OCH$_3$ | H | H |
| 38 | H | OC$_2$H$_5$ | H | H | OC$_2$H$_5$ | H | H |
| 39 | H | CH$_3$ | H | H | CH$_3$ | H | H |
| 40 | H | Cl | H | H | Cl | H | H |
| 41 | H | CH$_3$ | H | H | Cl | H | H |
| 42 | H | OCH$_3$ | H | OCH$_3$ | H | H | H |
| 43 | H | CH$_3$ | H | CH$_3$ | H | H | H |
| 44 | H | CH$_3$ | H | Cl | H | H | H |
| 45 | H | NO$_2$ | H | OCH$_3$ | H | H | H |
| 46 | H | H | OCH$_3$ | H | OCH$_3$ | H | H |
| 47 | H | OCH$_3$ | H | H | Cl | H | H |
| 48 | H | OCH$_3$ | H | Cl | OCH$_3$ | H | H |
| 49 | H | OCH$_3$ | H | OCH$_3$ | Cl | H | H |
| 50 | H | CH$_3$ | H | H | H | CH$_3$ | H |
| 51 | H | OCH$_3$ | H | H | Cl | H | H |
| 52 | H | CH$_3$ | H | OCH$_3$ | H | H | H |
| 53 | H | OCH$_3$ | H | Cl | CH$_3$ | H | H |
| 54 | H | H | H | H | H | H | OCH$_3$ |
| 55 | H | CH$_3$ | H | H | H | H | OCH$_3$ |
| 56 | H | OCH$_3$ | H | Cl | OCH$_3$ | H | OCH$_3$ |
| 57 | H | OCH$_3$ | H | H | H | H | Br |

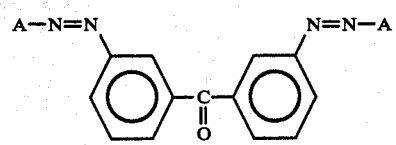

| Disazo Compound No. | A |
|---|---|
| 58 | 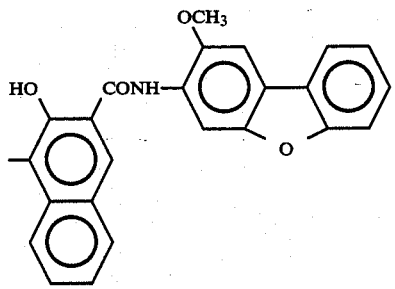 |

-continued
59 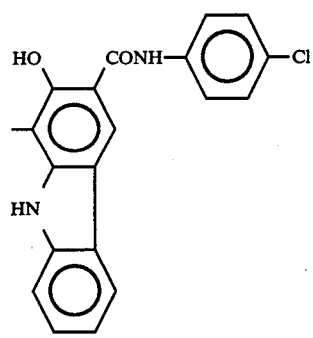
60 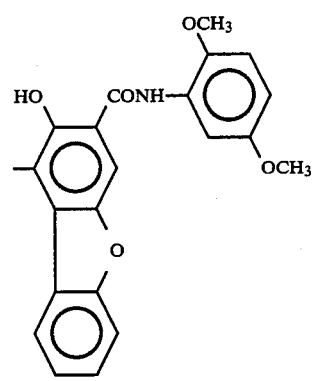
61 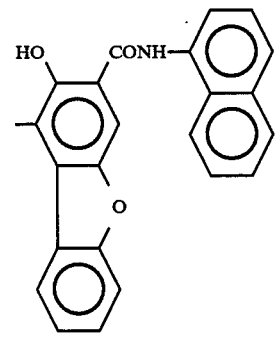
62 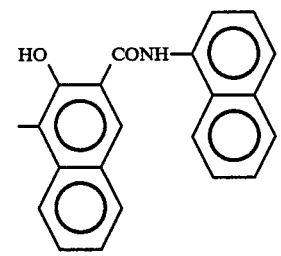
63 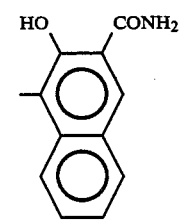

-continued
64 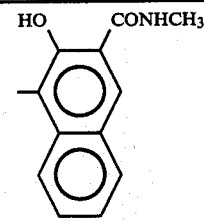
65 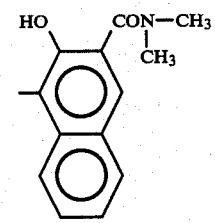
66 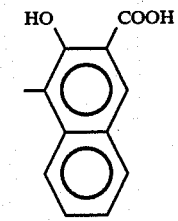
67 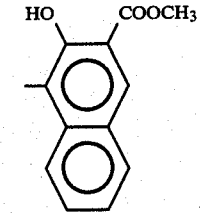
68 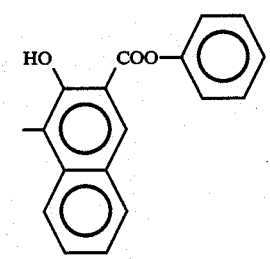
69 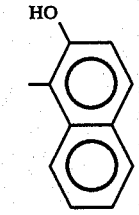
70 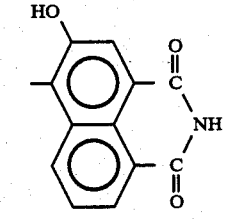

-continued
71 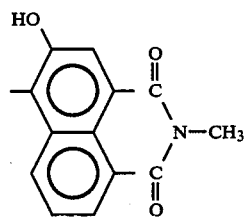
72 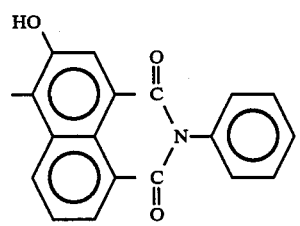
73 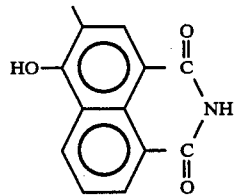
74 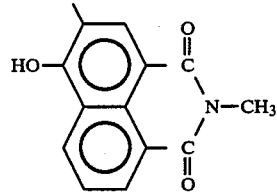
75 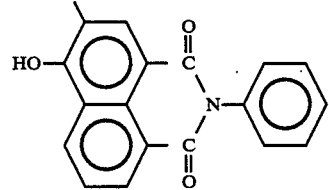
76 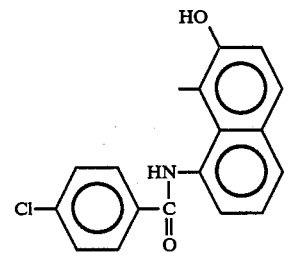

-continued
77 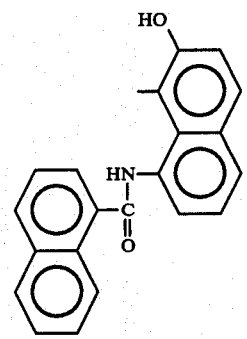
78 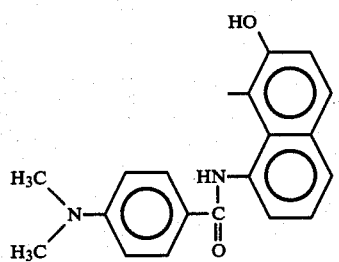
79 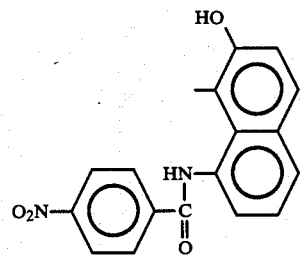
80 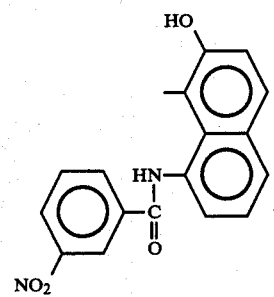
81 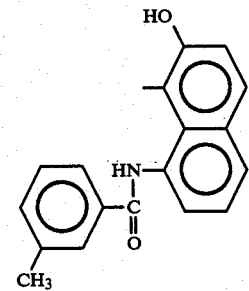

-continued
82 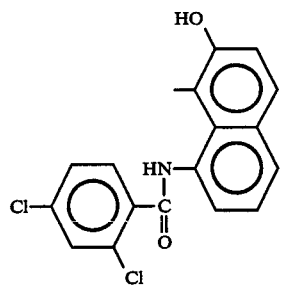
83 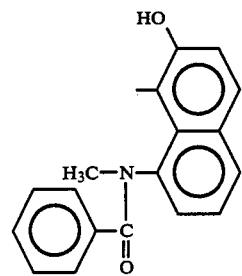
84 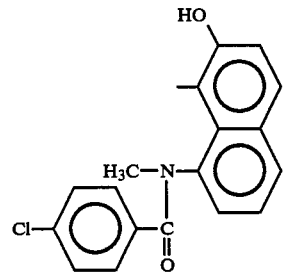
85 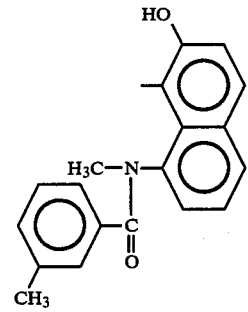
86 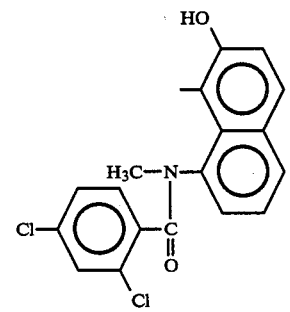

-continued
87 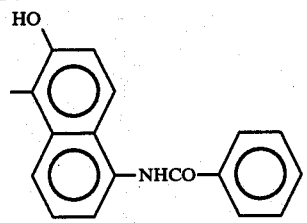
88 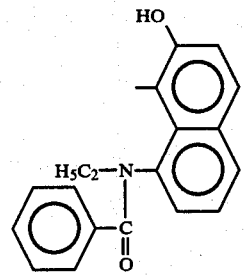
89 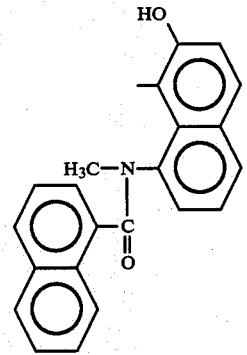
90 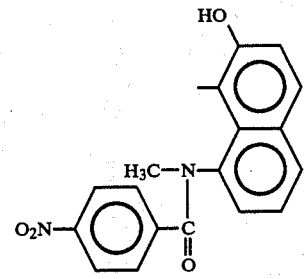
91 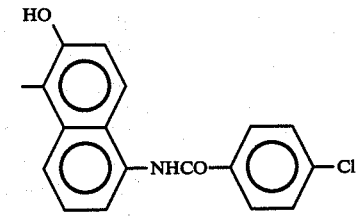
92 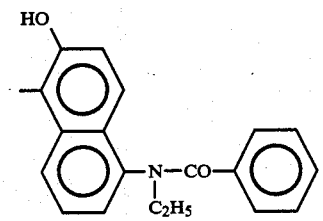

-continued
93 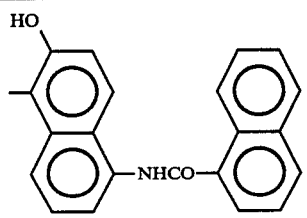
94 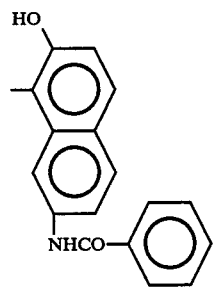
95 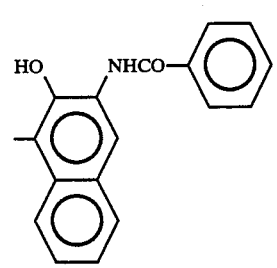
96 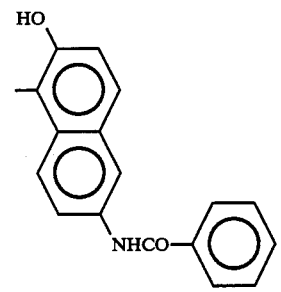
97 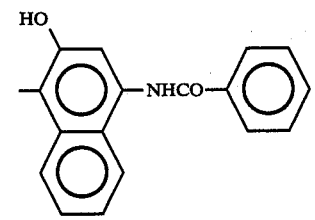
98 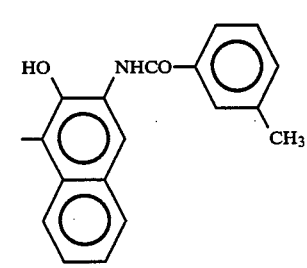

| | -continued |
|---|---|
| 99 | 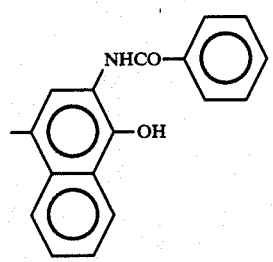 |
| 100 | 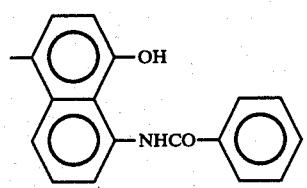 |
| 101 | 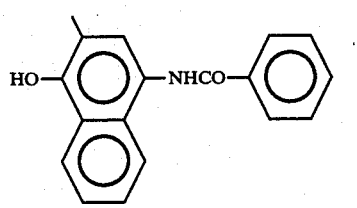 |
| 102 | 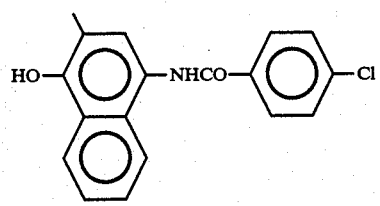 |
| 103 | 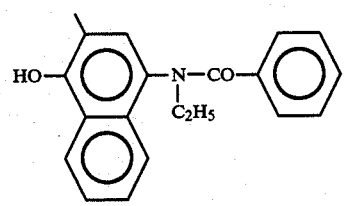 |
| 104 | 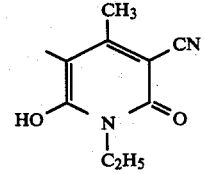 |
| 105 | 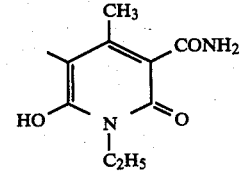 |

-continued
106 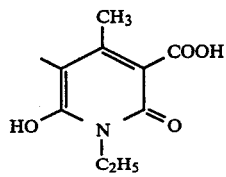
107 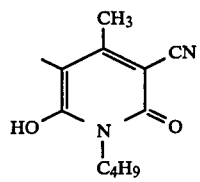
108 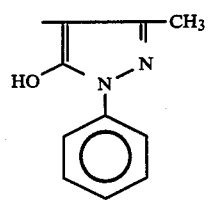
109 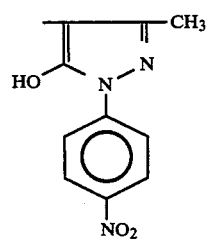
110 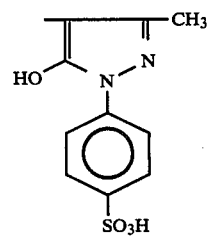
111 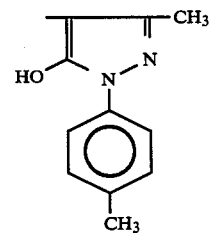
112 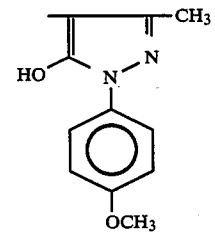

-continued
113 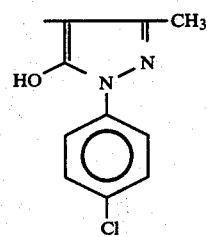
114 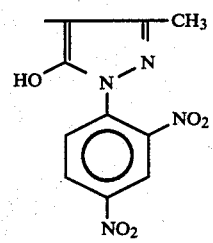
115 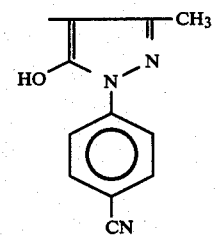
116 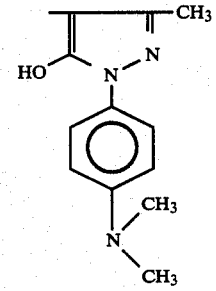
117 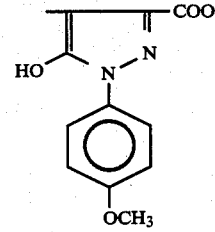
118 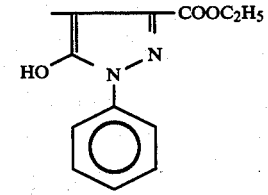
119 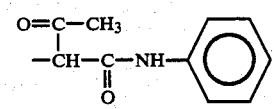

120

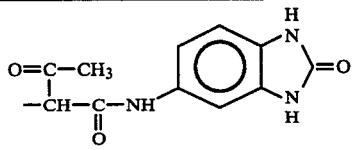

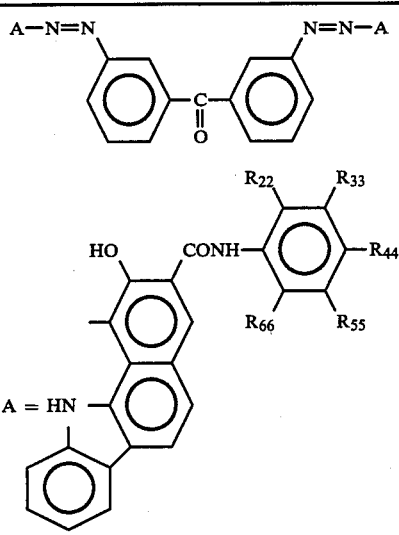

A = HN—

| Disazo Compound No. | $R_{22}$ | $R_{33}$ | $R_{44}$ | $R_{55}$ | $R_{66}$ |
|---|---|---|---|---|---|
| 121 | H | H | H | H | H |
| 122 | $NO_2$ | H | H | H | H |
| 123 | H | $NO_2$ | H | H | H |
| 124 | H | H | $NO_2$ | H | H |
| 125 | Cl | H | H | H | H |
| 126 | H | Cl | H | H | H |
| 127 | H | H | Cl | H | H |
| 128 | $CH_3$ | H | H | H | H |
| 129 | H | $CH_3$ | H | H | H |
| 130 | H | H | $CH_3$ | H | H |
| 131 | $C_2H_5$ | H | H | H | H |
| 132 | H | H | $C_2H_5$ | H | H |
| 133 | $OCH_3$ | H | H | H | H |
| 134 | H | $OCH_3$ | H | H | H |
| 135 | H | H | $OCH_3$ | H | H |
| 136 | $OC_2H_5$ | H | H | H | H |
| 137 | H | H | $OC_2H_5$ | H | H |
| 138 | $CH_3$ | H | $OCH_3$ | H | H |
| 139 | $CH_3$ | H | $CH_3$ | H | H |
| 140 | $CH_3$ | H | H | $CH_3$ | H |
| 141 | $CH_3$ | H | H | H | $CH_3$ |
| 142 | $OCH_3$ | H | $OCH_3$ | H | H |
| 143 | $OCH_3$ | H | H | $OCH_3$ | H |
| 144 | H | $OCH_3$ | H | $OCH_3$ | H |
| 145 | $CH_3$ | Cl | H | H | H |
| 146 | $CH_3$ | H | Cl | H | H |
| 147 | $CH_3$ | H | H | Cl | H |
| 148 | H | H | H | H | H |
| 149 | $NO_2$ | H | H | H | H |
| 150 | H | $NO_2$ | H | H | H |
| 151 | H | H | $NO_2$ | H | H |
| 152 | Cl | H | H | H | H |
| 153 | H | Cl | H | H | H |
| 154 | H | H | Cl | H | H |
| 155 | $CH_3$ | H | H | H | H |
| 156 | H | $CH_3$ | H | H | H |
| 157 | H | H | $CH_3$ | H | H |
| 158 | $OCH_3$ | H | H | H | H |
| 159 | H | $OCH_3$ | H | H | H |
| 160 | H | H | $OCH_3$ | H | H |
| 161 | $CH_3$ | H | $OCH_3$ | H | H |
| 162 | $OCH_3$ | H | Cl | $CH_3$ | H |
| 163 | $CH_3$ | H | H | H | $CH_3$ |

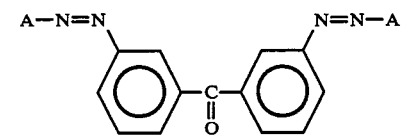

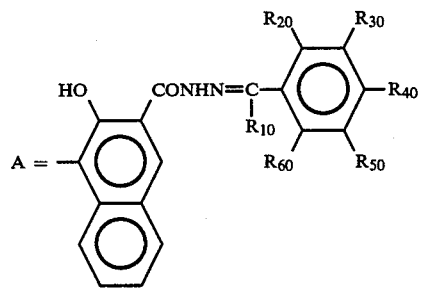

| Disazo Compound No. | $R_{10}$ | $R_{20}$ | $R_{30}$ | $R_{40}$ | $R_{50}$ | $R_{60}$ |
|---|---|---|---|---|---|---|
| 164 | H | H | H | H | H | H |
| 165 | H | $NO_2$ | H | H | H | H |
| 166 | H | H | $NO_2$ | H | H | H |
| 167 | H | H | H | $NO_2$ | H | H |
| 168 | H | Cl | H | H | H | H |

-continued
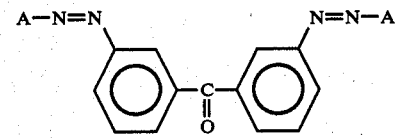
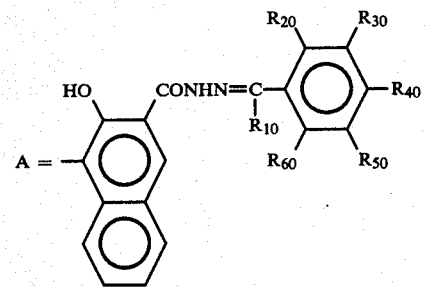
| Disazo Compound No. | R₁₀ | R₂₀ | R₃₀ | R₄₀ | R₅₀ | R₆₀ |
|---|---|---|---|---|---|---|
| 169 | H | H | Cl | H | H | H |
| 170 | H | H | H | Cl | H | H |
| 171 | H | CH₃ | H | H | H | H |
| 172 | H | H | CH₃ | H | H | H |
| 173 | H | H | H | CH₃ | H | H |
| 174 | H | OCH₃ | H | H | H | H |
| 175 | H | H | OCH₃ | H | H | H |
| 176 | H | H | H | OCH₃ | H | H |
| 177 | H | H | H | N(CH₃)₂ | H | H |
| 178 | H | F | H | H | H | H |
| 179 | H | H | F | H | H | H |
| 180 | H | H | H | F | H | H |
| 181 | H | Br | H | H | H | H |
| 182 | H | H | Br | H | H | H |
| 183 | H | H | H | Br | H | H |
| 184 | H | Cl | H | Cl | H | H |
| 185 | H | H | Cl | Cl | H | H |
| 186 | H | CN | H | H | H | H |
| 187 | H | H | H | CN | H | H |
| 188 | H | CH₃ | H | CH₃ | H | H |
| 189 | H | OCH₃ | H | H | OCH₃ | H |
| 190 | H | OCH₃ | OCH₃ | OCH₃ | H | H |
| 191 | H | CH₃ | H | H | H | CH₃ |
| 192 | CH₃ | H | H | H | H | H |
| 193 | —CH₂—C₆H₅ | H | H | H | H | H |
| 194 | —C₆H₅ | H | H | H | H | H |
| 195 | H | H | H | H | —N(—C₆H₅)₂ | H |

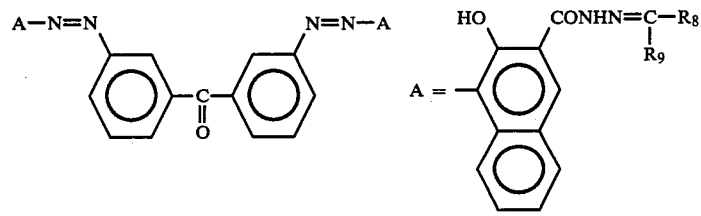
| Disazo Compound No. | R8 | R9 |
|---|---|---|
| 196 | CH3 | CH3 |
| 197 | H | —CH=CH—C6H5 |
| 198 | H | —CH=C(CH3)—C6H5 |
| 199 | H | furyl |
| 200 | H | pyridyl |
| 201 | H | thienyl |
| 202 | CH3 | thienyl |
| 203 | H | naphthyl |
| 204 | H | anthryl |

-continued
| | | |
|---|---|---|
| 205 | H | 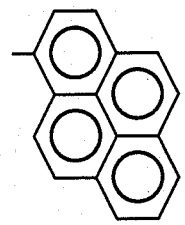 |
| 206 | H | 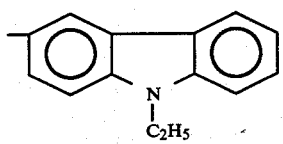 |
| 207 | H | 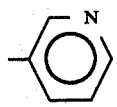 |
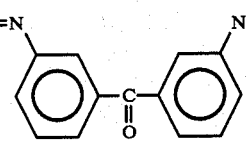   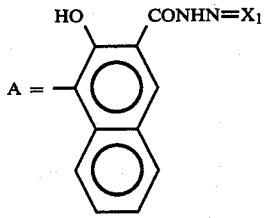
| Disazo Compound No. | $X_1$ |
|---|---|
| 208 | 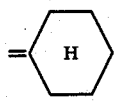 |
| 209 | 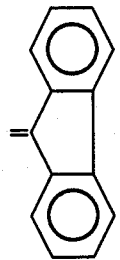 |
| 210 | 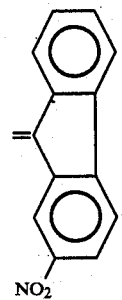 |

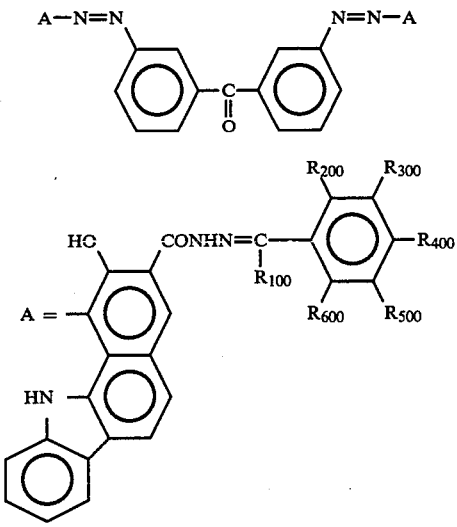

| Disazo Compound No. | $R_{100}$ | $R_{200}$ | $R_{300}$ | $R_{400}$ | $R_{500}$ | $R_{600}$ |
|---|---|---|---|---|---|---|
| 211 | H | H | H | H | H | H |
| 212 | H | $NO_2$ | H | H | H | H |
| 213 | H | H | $NO_2$ | H | H | H |
| 214 | H | H | H | $NO_2$ | H | H |
| 215 | H | Cl | H | H | H | H |
| 216 | H | H | Cl | H | H | H |
| 217 | H | H | H | Cl | H | H |
| 218 | H | $CH_3$ | H | H | H | H |
| 219 | H | H | $CH_3$ | H | H | H |
| 220 | H | H | H | $CH_3$ | H | H |
| 221 | H | $OCH_3$ | H | H | H | H |
| 222 | H | H | $OCH_3$ | H | H | H |
| 223 | H | H | H | $OCH_3$ | H | H |
| 224 | H | H | H | $N(CH_3)_2$ | H | H |
| 225 | H | F | H | H | H | H |
| 226 | H | H | F | H | H | H |
| 227 | H | H | H | F | H | H |
| 228 | H | Br | H | H | H | H |
| 229 | H | H | Br | H | H | H |
| 230 | H | H | H | Br | H | H |
| 231 | H | Cl | H | Cl | H | H |
| 232 | H | H | Cl | Cl | H | H |
| 233 | H | CN | H | H | H | H |
| 234 | H | H | H | CN | H | H |
| 235 | H | $CH_3$ | H | $CH_3$ | H | H |
| 236 | H | $OCH_3$ | H | H | $OCH_3$ | H |
| 237 | H | $OCH_3$ | $OCH_3$ | $OCH_3$ | H | H |
| 238 | H | $CH_3$ | H | H | H | $CH_3$ |
| 239 | $CH_3$ | H | H | H | H | H |
| 240 | $-CH_2-\text{C}_6\text{H}_5$ | H | H | H | H | H |
| 241 | $-\text{C}_6\text{H}_4\text{-CH}_3$ | H | H | H | H | H |
| 242 | H | H | H | H | $-N(-\text{C}_6\text{H}_5)_2$ | H |

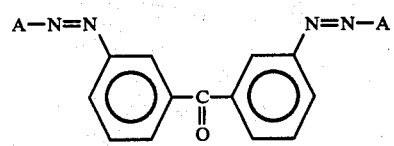
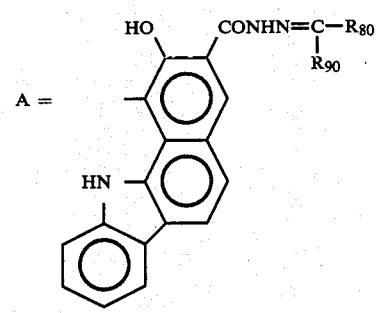
A =
| Disazo Compound No. | $R_{80}$ | $R_{90}$ |
|---|---|---|
| 243 | $CH_3$ | $CH_3$ |
| 244 | H | 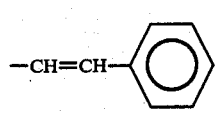 |
| 245 | H | 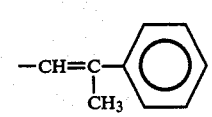 |
| 246 | H | 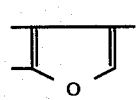 |
| 247 | H | 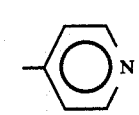 |
| 248 | H | 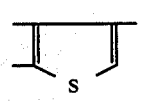 |
| 249 | $CH_3$ | 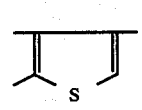 |
| 250 | H | 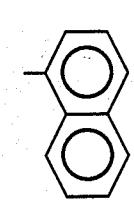 |
| 251 | H | 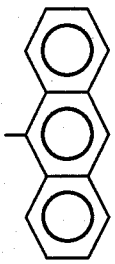 |
| 252 | H | 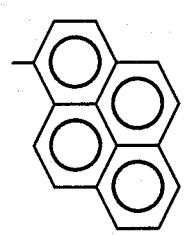 |
| 253 | H | 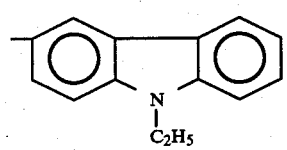 |
| 254 | H |  |
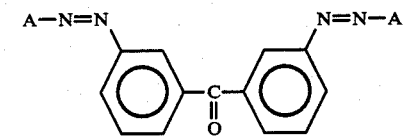
A =
| Disazo Compound No. | $X_2$ |
|---|---|
| 255 |  |

256

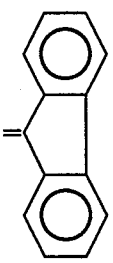

257

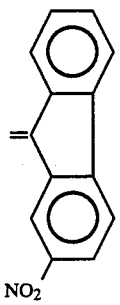

The photosensitive material containing the above mentioned disazo compound of the formula (I) or (I)' of the present invention for use in electrophotography can be easily prepared and has a high sensitivity and a photosensitive wave length zone lying in such a shorter wave length zone as to be suitable for reproducing an image of a reddish original.

Tetrazonium salt compound having the general formula (II) is a useful intermediate for a disazo compound, and is used in combination with an appropriate coupler to synthesize various types of disazo compounds having a benzophenone structure and having azo group at 3-position and 3'-position. These disazo compounds are expected to be useful photoconductive materials for an electrophotographic element, particularly as a charge generating material.

Typical Examples of an anion functional group of the tetrazonium salt compound of the general formula (II) include $Cl^-$, $Br^-$, $I^-$, $BF_4^-$, $PF_6^-$,

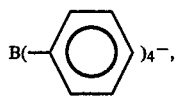

$ClO_4^-$, $SO_4^{2-}$,

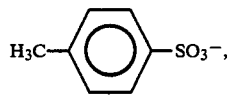

$AsF_6^-$ and $SbF_6^-$, and among them, $BF_4^-$ is preferable.

As mentioned above, the disazo compounds having the formulas (I) and (I)' of the present invention are useful as a charge generating material for a laminated type electrophotographic element. These disazo compounds are useful as a charge generating material also for an electrophotographic element having a single layer type photosensitive material having both charge generating material and charge transfer material dispersed in resin, and is further useful as a photoconductive material for an electrophotographic element having a photosensitive layer having photoconductive material dispersed in resin.

A tetrazonium salt having the general formula (II) of the present invention can be obtained by reducing, for example, 3,3'-dinitrobenzophenone to prepare 3,3'-diaminobenzophenone, and diazotizing the diamino compound thus prepared.

The diazotization of 3,3'-diaminobenzophenone is carried out in an inorganic acid such as hydrochloric acid or sulfuric acid by adding sodium nitrite at $-10°$ C. to $20°$ C. This diazotization is completed in 30 minutes to 3 hours. To the reactive mixture is added borofluoric acid, sodium borofluoride aqueous solution or the like to obtain a tetrazonium salt.

A disazo compound having the general formula (I) or (I)' can be prepared (a) by reacting the above diazotization reaction solution directly with a coupler or (b) by adding borofluoric acid, sodium borofluoride aqueous solution or the like to the above diazotization reaction solution to precipitate a tetrazonium salt expressed by the general formula (II), isolating the precipitated tetrazonium salt and reacting the isolated tetrazonium salt with a coupler. From the stoichiometrical view point, one mole of a tetrazonium salt is reacted with two moles of a coupler, but from practical view point, 1.5–4 moles, preferably 2–3 moles of the coupler is supplied to one mole of the tetrazonium salt when taking manufacturing cost and the purity of the pigment obtained into consideration. In practice, this reaction is carried out by dissolving a mixture of the tetrazonium salt and coupler in an organic solvent such as N,N-dimethylformaldehyde (DMF), dimethylsulfoxide (DMSO) or the like, and adding drop-wise an alkaline aqueous solution to the reaction solution such as sodium acetate aqueous solution at about $-10°$ C. to $40°$ C. This reaction is completed in about 5 minutes to 3 hours. After the completion of the reaction, the precipitated crystal is filtered out and is finally purified by an appropriate method (for example by washing, recrystalizing or the like with water and/or organic solvent).

The novel disazo compound prepared in accordance with the present invention as mentioned above, is a colored crystal at normal temperature, examples of which are illustrated in the following Tables 1 and 2, together with their melting point, elemental analysis and infrared absorption spectrum data.

TABLE 1

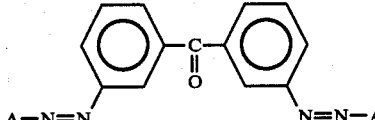

| Disazo Compound No. | $R_1$ | $R_2$ | $R_3$ | Elemental Analysis (Calculated Value) | | | Melting Point (°C.) | Infrared Absorption Spectrum (KBr Disk) | |
|---|---|---|---|---|---|---|---|---|---|
| | | | | C % | H % | N % | | $\nu$NH (cm$^{-1}$) | $\nu$CO (cm$^{-1}$) |
| 1 | H | H | H | 74.51 (74.20) | 4.53 (4.24) | 10.92 (11.05) | >300 | 3230 3180 | 1675 1655 |
| 17 | Cl | H | H | 68.05 (68.04) | 3.58 (3.64) | 9.96 (10.13) | >300 | 3200 | 1680 |
| 18 | H | Cl | H | 68.10 (68.04) | 3.49 (3.64) | 10.10 (10.13) | >300 | 3200 | 1680 |
| 19 | H | H | Cl | 68.10 (68.04) | 3.56 (3.64) | 10.18 (10.13) | >300 | 3250 3200 | 1680 1650 |
| 2 | NO$_2$ | H | H | 66.23 (66.35) | 3.38 (3.55) | 12.95 (13.17) | >300 | 3200 | 1680 |
| 3 | H | NO$_2$ | H | 66.40 (66.35) | 3.44 (3.55) | 12.91 (13.17) | >300 | 3200 | 1680 |
| 4 | H | H | NO$_2$ | 66.10 (66.35) | 3.38 (3.55) | 12.95 (13.17) | >300 | — | 1685 |

TABLE 2

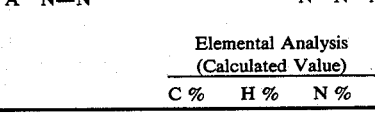

| Disazo Compound No. | A | Elemental Analysis (Calculated Value) | | | Melting Point (°C.) | Infrared Absorption Spectrum (KBr Disk) | |
|---|---|---|---|---|---|---|---|
| | | C % | H % | N % | | $\nu$NH(cm$^{-1}$) | $\nu$CO(cm$^{-1}$) |
| 121 | 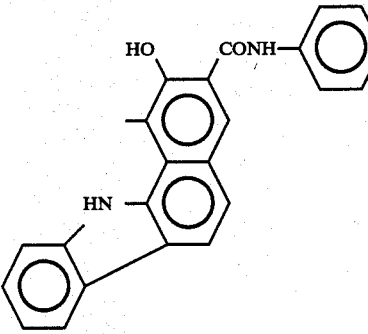 | (75.84) (75.46) | 3.97 (4.08) | 11.69 (11.94) | >300 | 3470 (carbazole) 3250 | 1675 |
| 164 | 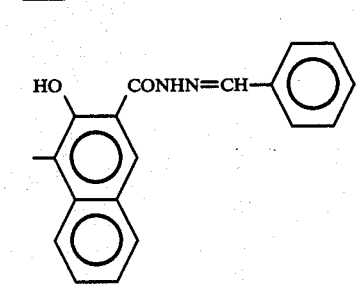 | 72.69 (72.22) | 4.13 (4.21) | 13.79 (13.75) | >300 | 3200 | 1680 1660 |

The following Examples 1 to 10 illustrate the preparation of a tetrazonium salt and a disazo compound of the present invention.

EXAMPLE 1

(Preparation of Tetrazonium Salt)

10.4 g of 3,3'-diamino-benzophenone was added to a hydrochloric acid aqueous solution comprising 100 ml of water and 25 ml of conc. hydrochloric acid. The resultant mixture was heated at about 60° C. for one hour and thereafter cooled to −3° C. To the cooled mixture was added drop-wise, at a temperature of −3° C. to 0° C., for 30 minutes, a solution prepared by dissolving 7.32 g of sodium nitrite in 25 ml water. The resultant mixture was stirred at the same temperature for 30 minutes. 42% borofluoric acid was added to the resultant reaction solution to precipitate a crystal. The precipitated crystal was filtered out and the crystal was subjected to washing with water and drying, thus obtaining 10.8 g of a light yellow crystal of bisdiazonium bistetrafluoroborate (yield=54%). An infrared absorption spectrum (KBr tablet method) of this product is shown in FIG. 1. An absorption band on the basis of $N_2^+$ appeared at 2280 cm$^{-1}$ and an absorption band on the basis of $>C=O$ appeared at 1680 cm$^{-1}$.

EXAMPLE 2

(Preparation of Disazo Compound No. 1)

1.02 g of the tetrazonium salt prepared in the above Example 1 and 1.32 g (two times mol of tetrazonium salt) of 2-hydroxy-3-naphthoic acid anilide as a coupler were dissolved in 150 ml of cooled N,N-dimethylformamide. To this solution, was added drop-wise a solution comprising 0.82 g of sodium acetate and 7 ml of water at a temperature of 5°-10° C. for 5 minutes. Thereafter, the resultant mixture was stirred for 3 hours at room temperature. The produced precipitate was filtered out, and was washed for 3 times with 200 ml of N,N-dimethylformamide heated to 80° C. and further with 200 ml of water for 2 times. The washed precipitate was dried at 80° C. under a reduced pressure of 2 mm Hg, thus obtaining 1.50 g (yield=78.9%) of the above disazo compound No. 1 shown in Table 1.

Figure 2:
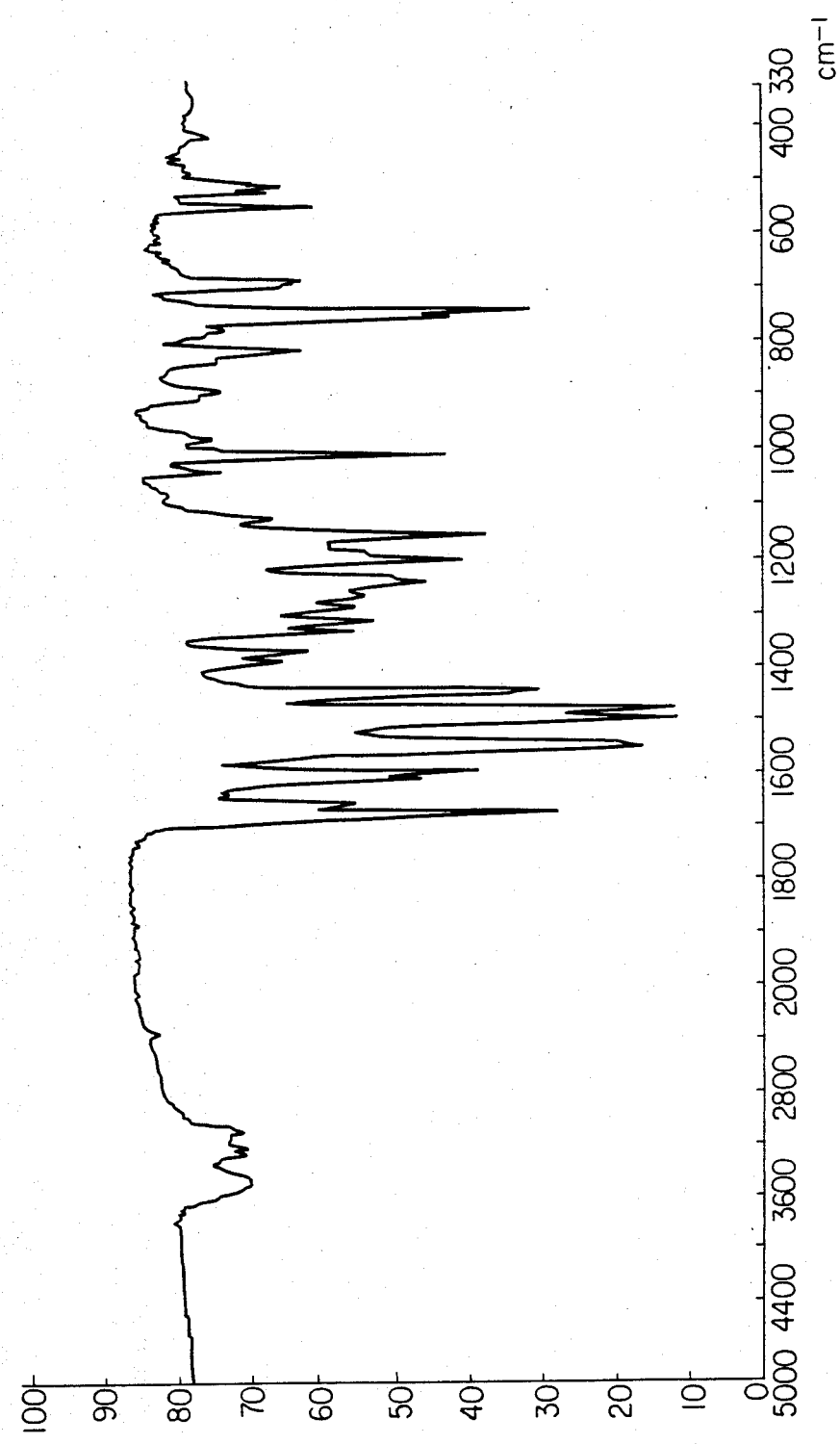
FIGS. 2 to 10 show infrared absorption spectrums (KBr tablet method) of typical disazo compounds of the present invention.

The appearance of disazo compound thus obtained was reddish orange color powder, the infrared absorption spectrum (KBr tablet method) of which is shown in FIG. 2.

EXAMPLES 3 TO 10

The same procedure as in the above preparation Example 2 was repeated, except that compounds as mentioned in the following Table 3 were used as couplers to prepare the disazo compounds shown in Tables 1 and 2. The yields and appearances of the disazo compounds thus obtained are shown in the following Table 3.

Figure 3:
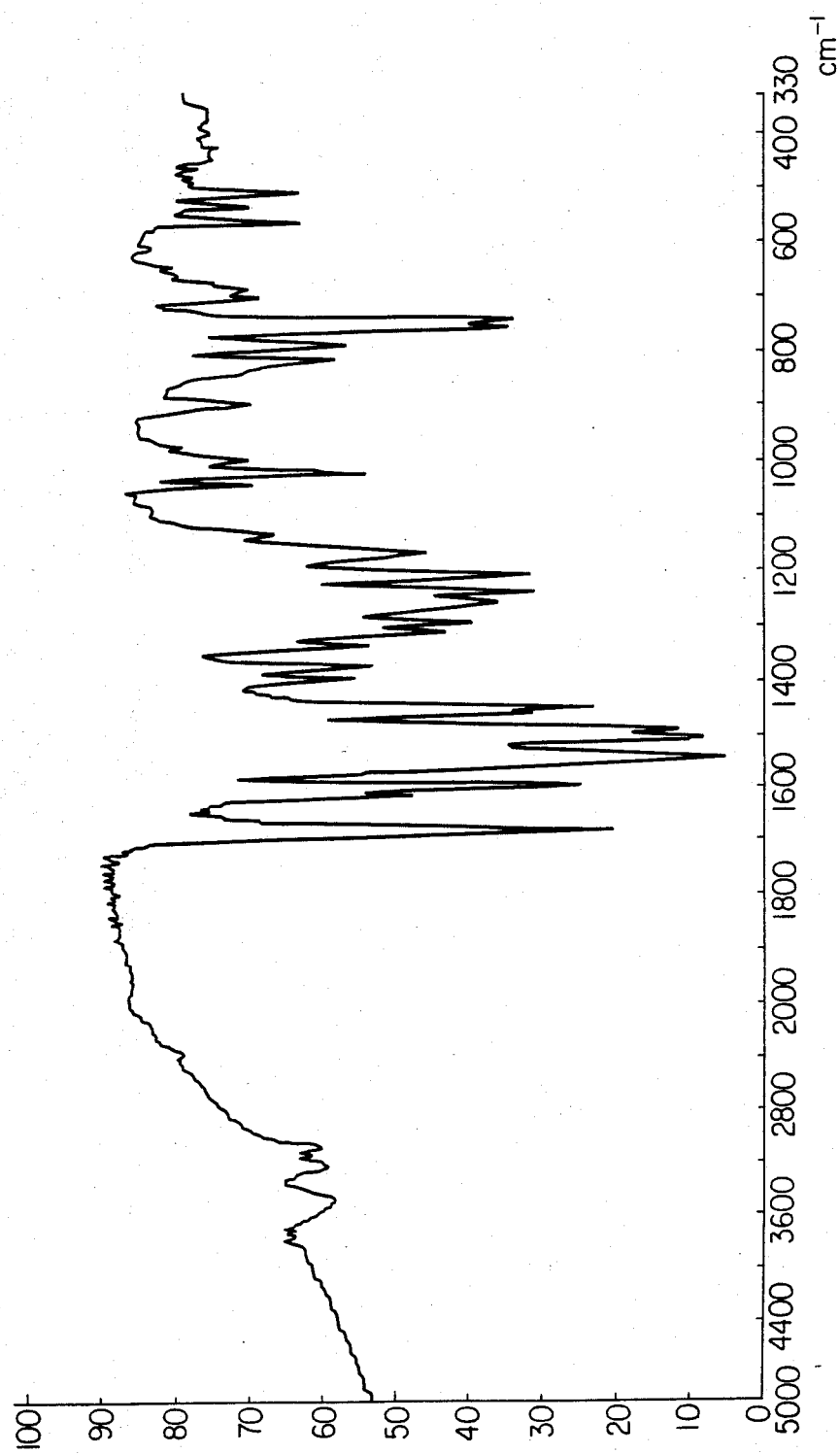
Figure 4:
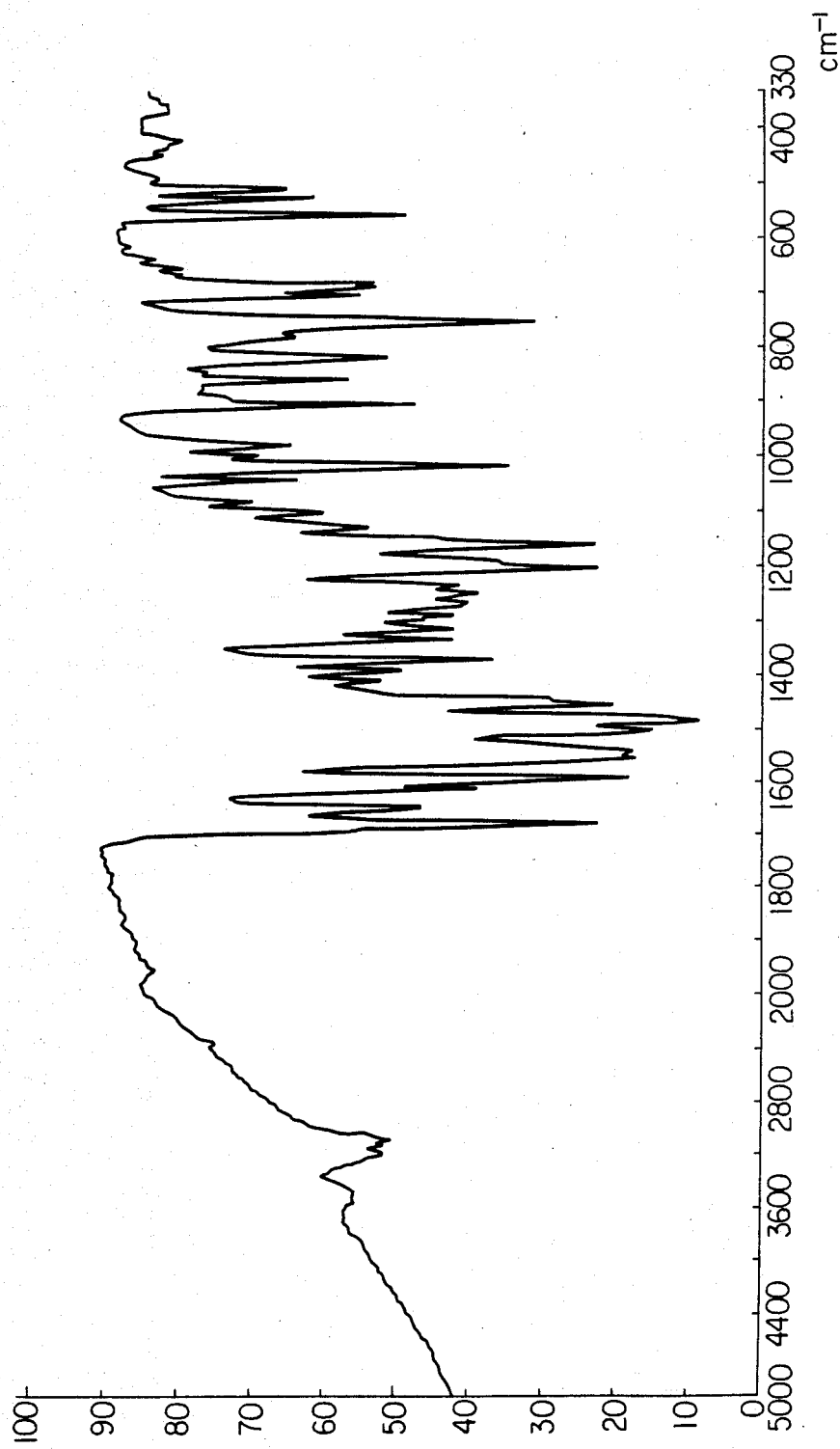
Figure 5:
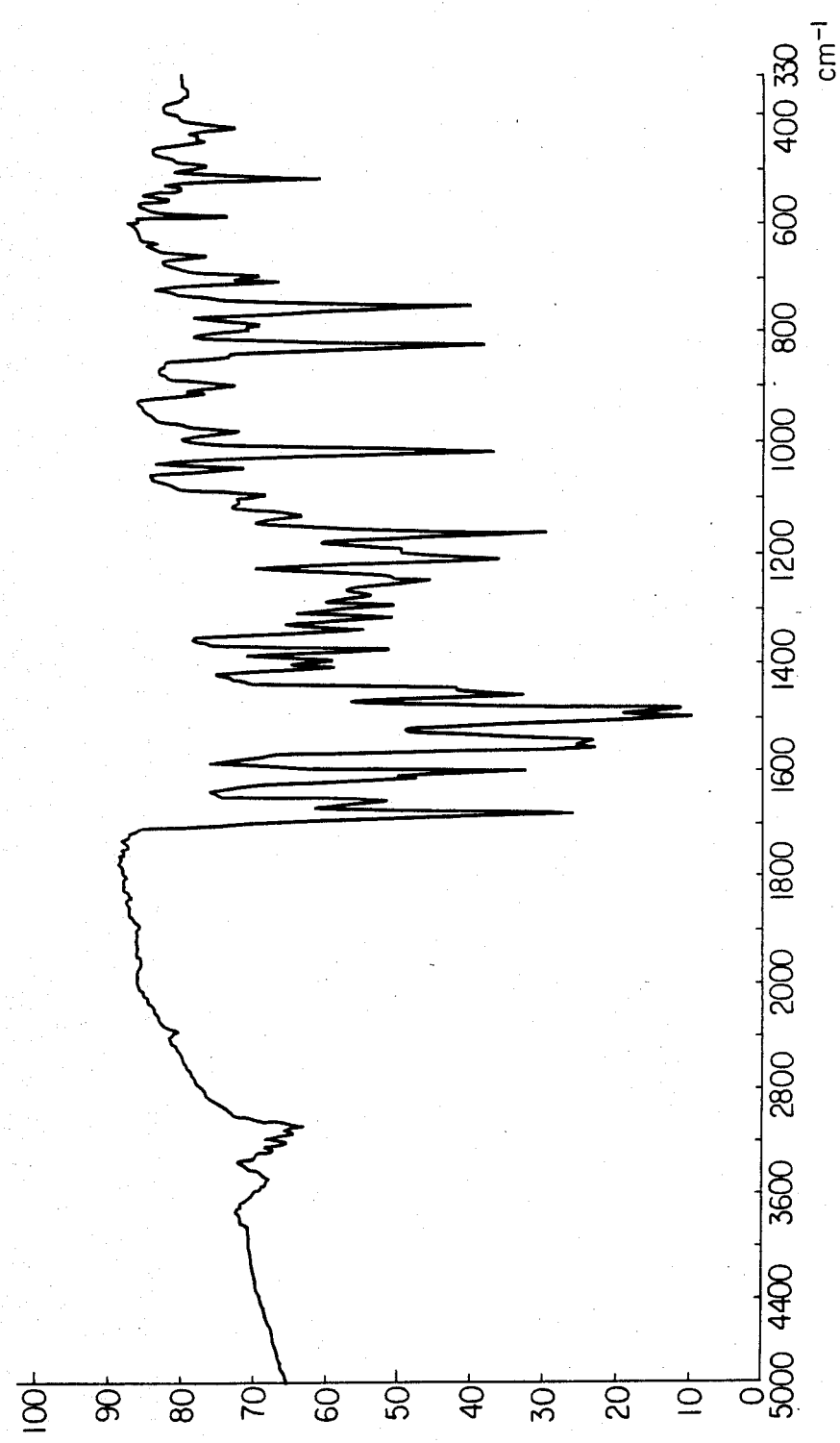
Figure 6:
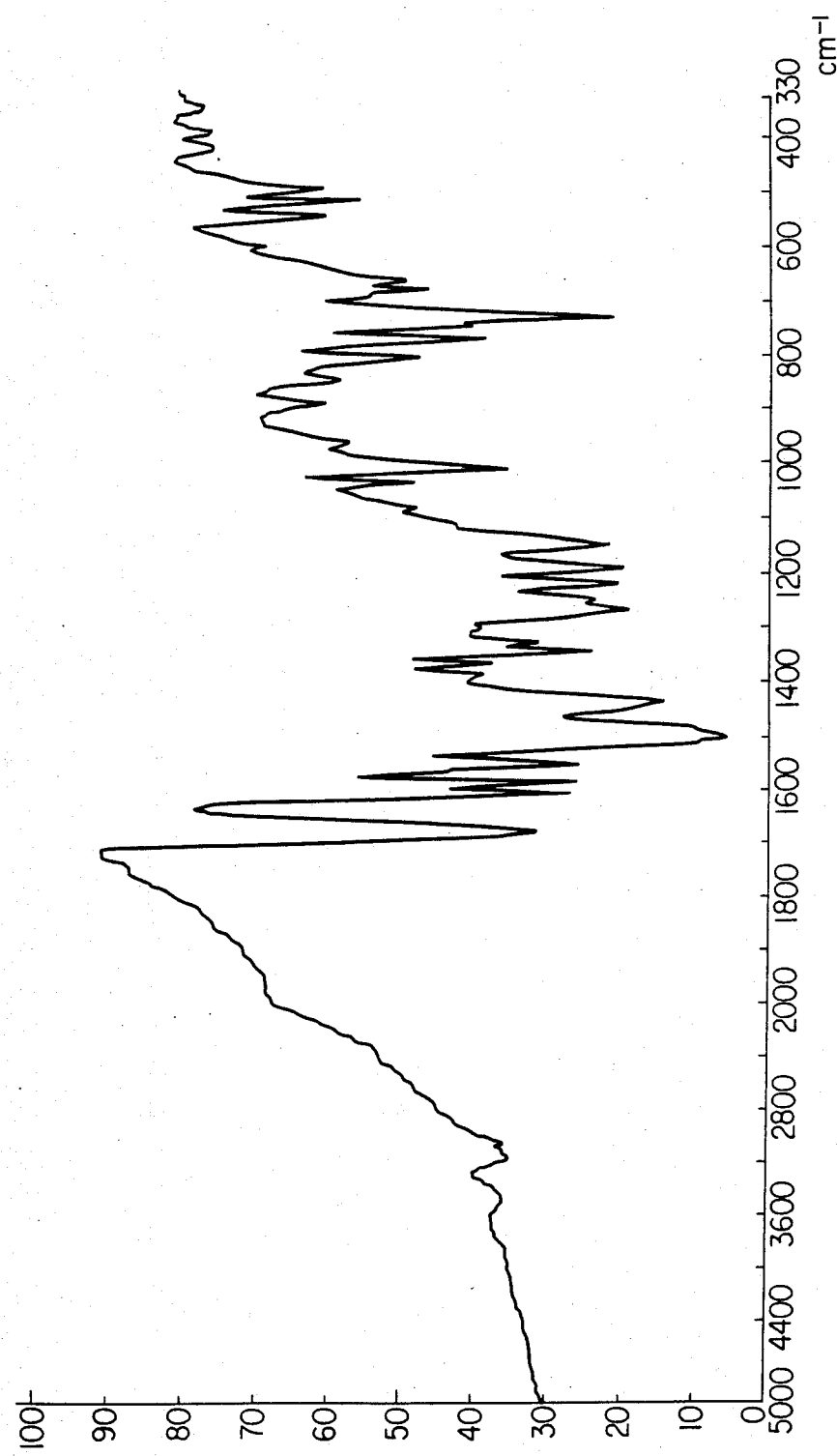
Figure 7:
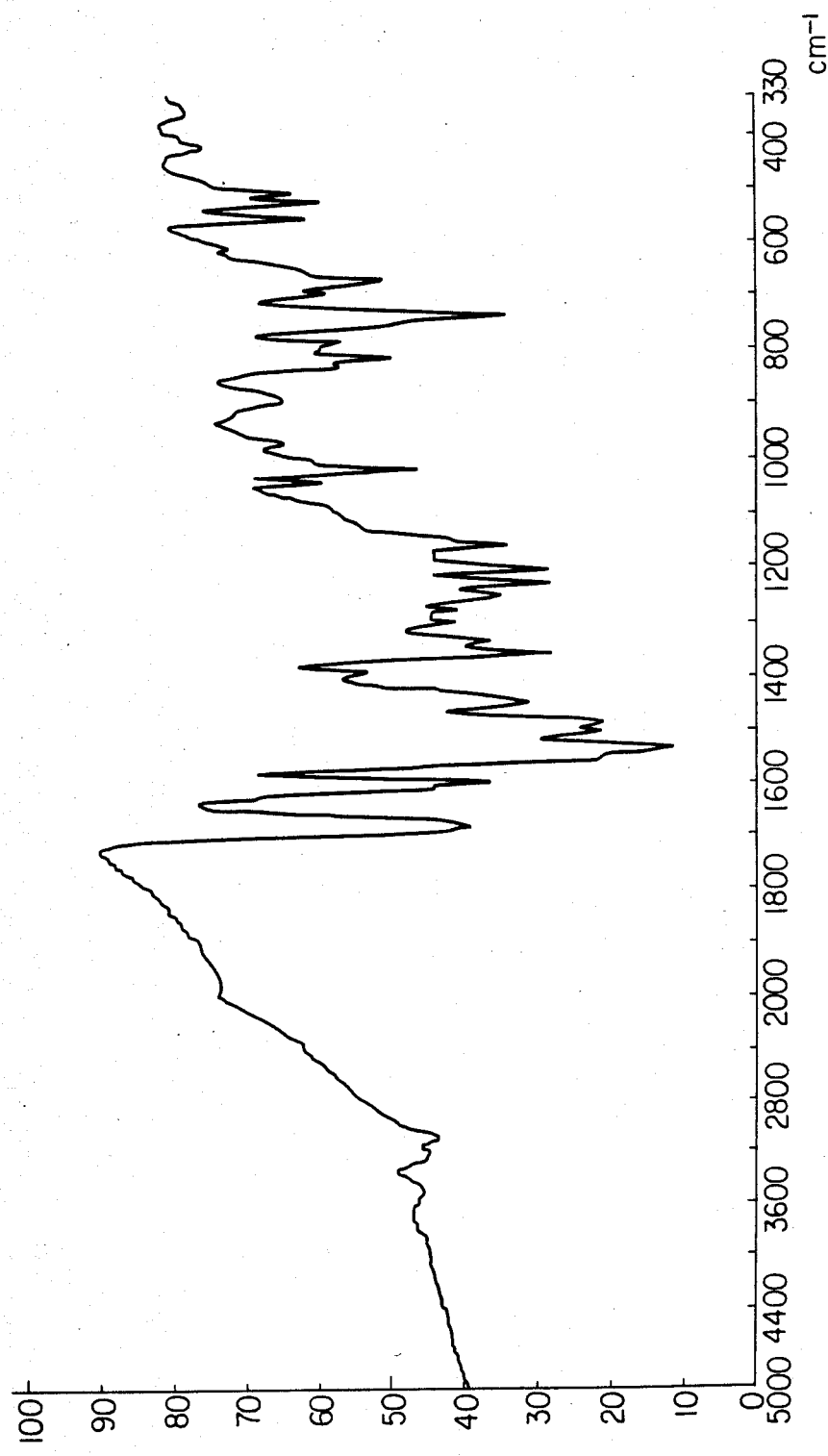
Figure 8:
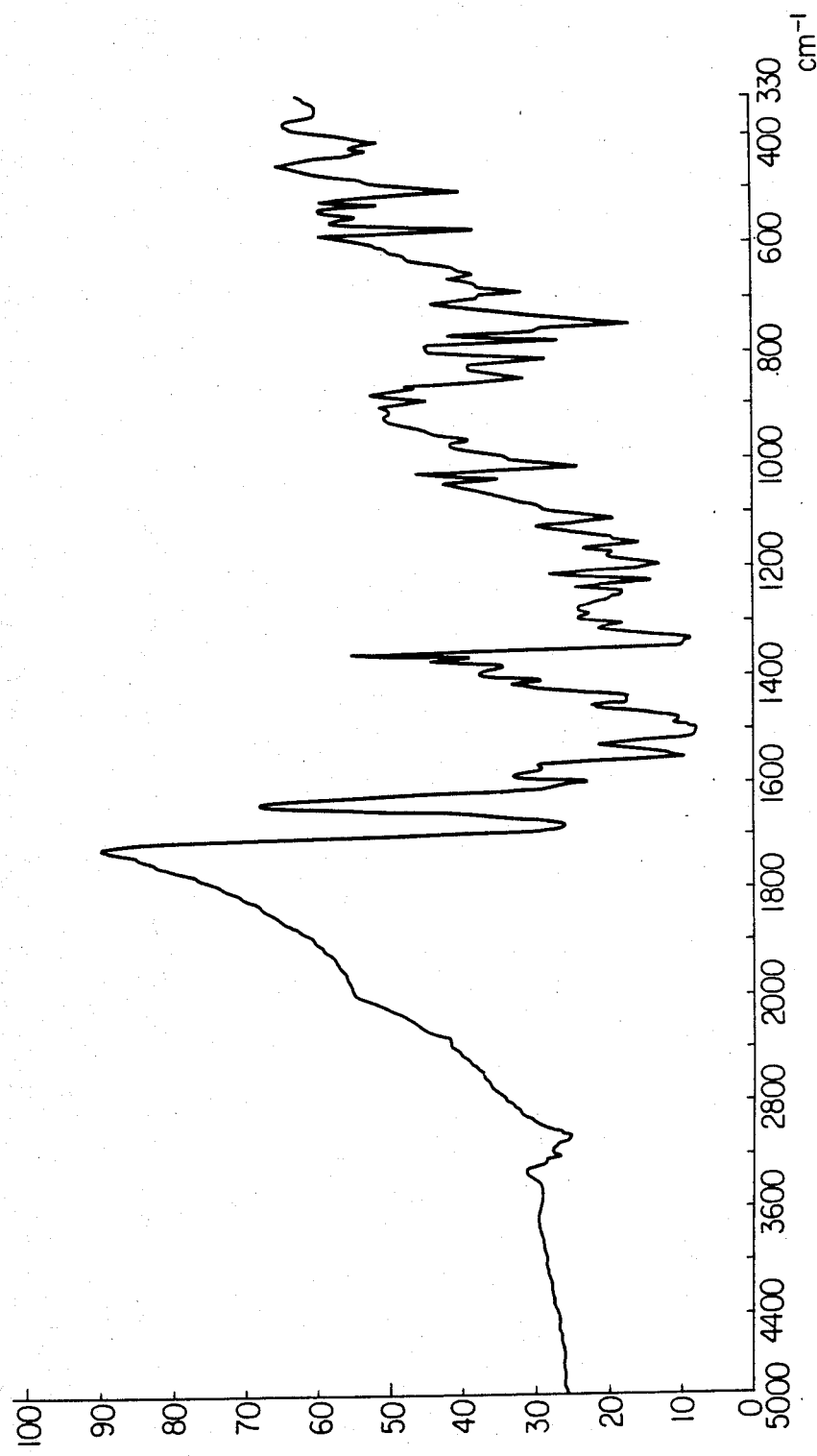
Figure 9:
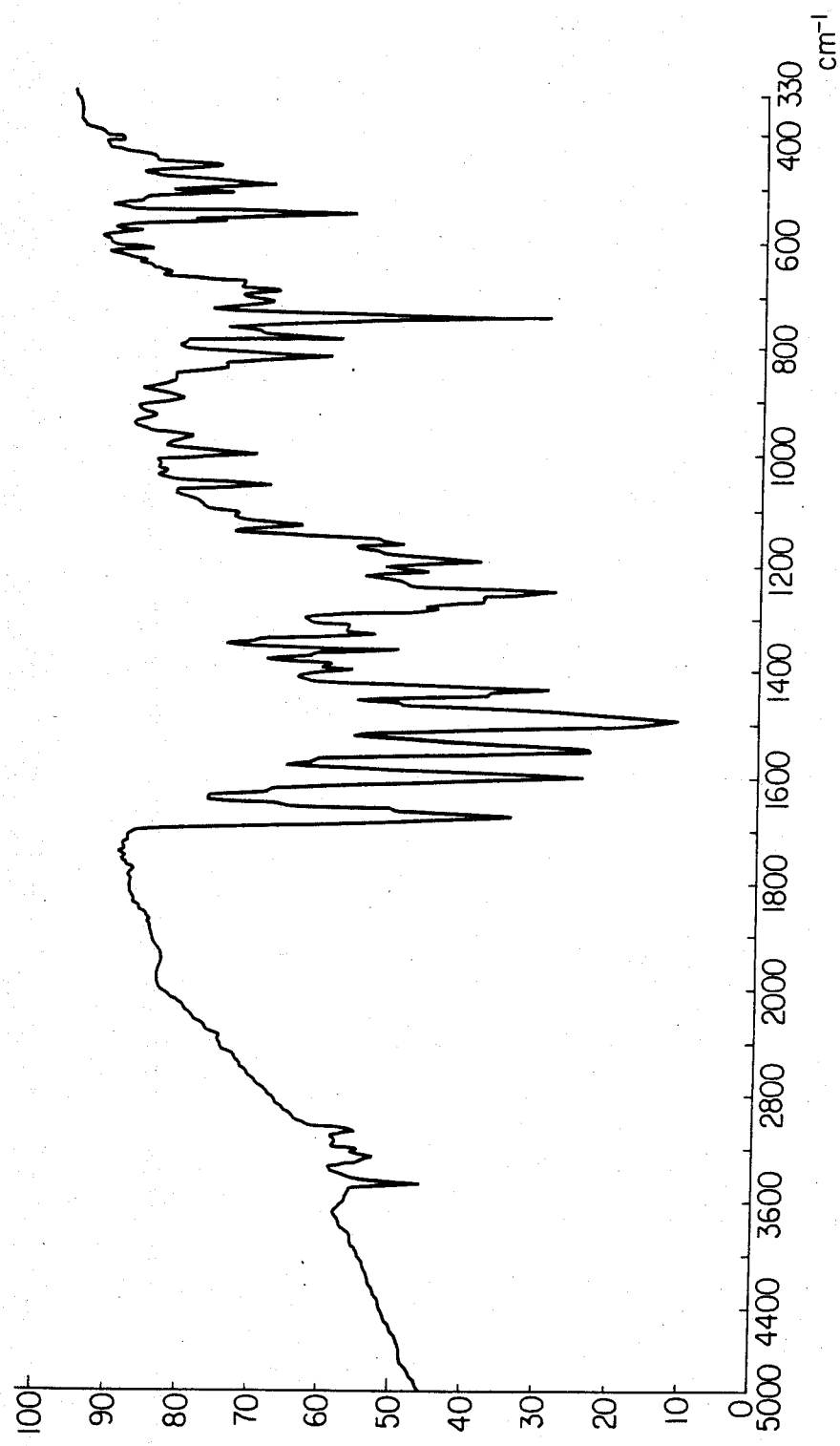
Figure 10:
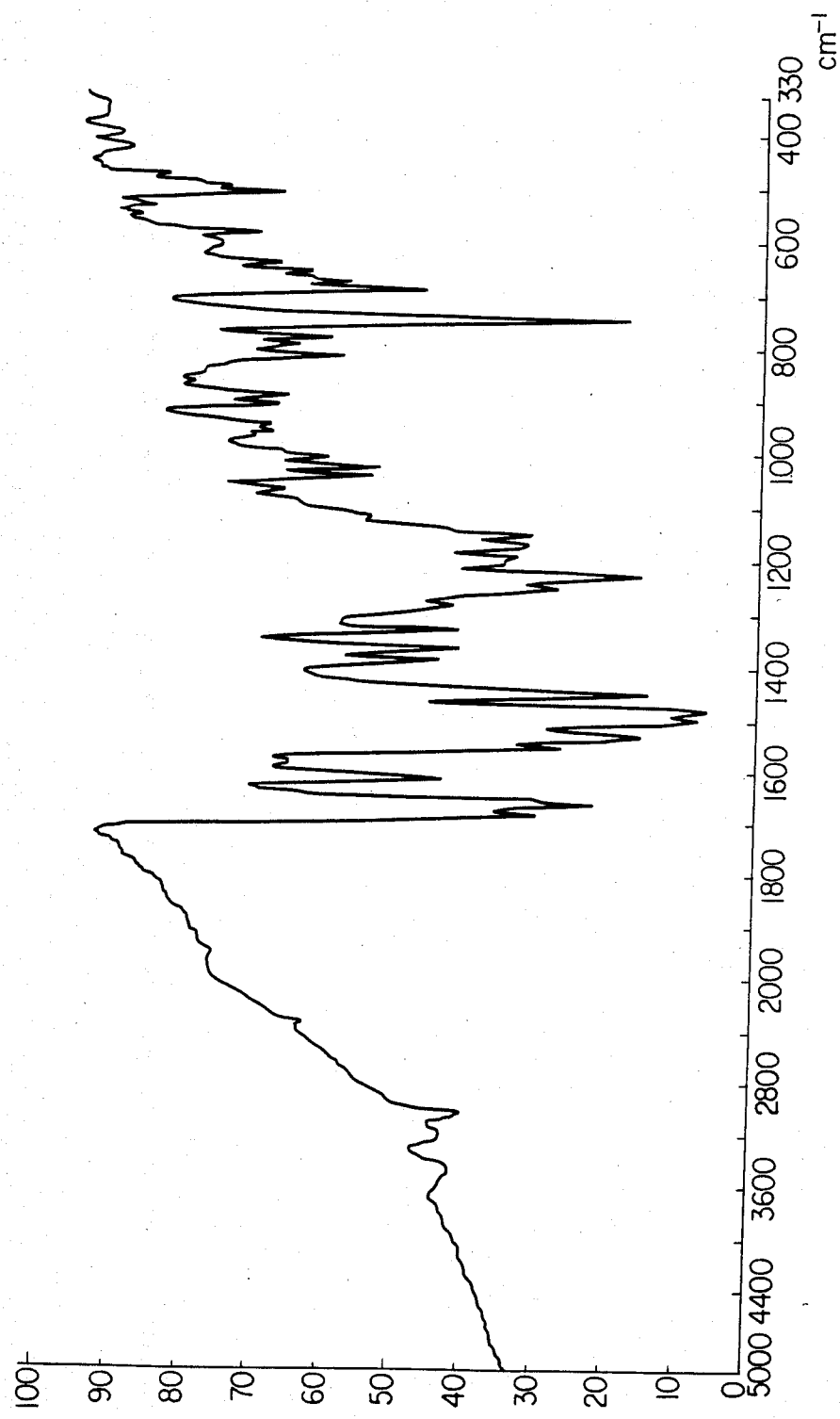

The infrared absorption spectrums (KBr tablet method) of the disazo compounds thus obtained are respectively shown in FIG. 3 (Compound No. 17), FIG. 4 (Compound No. 18), FIG. 5 (Compound No. 19), FIG. 6 (Compound No. 2), FIG. 7 (Compound No. 3), FIG. 8 (Compound No. 4), FIG. 9 (Compound No. 121) and FIG. 10 (Compound No. 164).

TABLE 3

| Disazo Compound No. | Coupler | Yield (%) | Appearance |
| --- | --- | --- | --- |
| 17 | 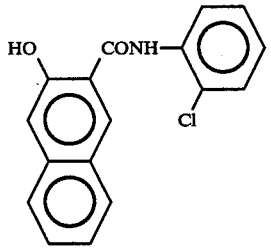 | 81.6 | reddish orange color |
| 18 | 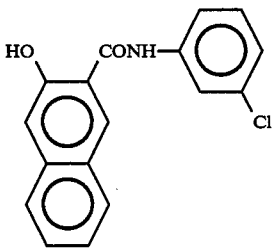 | 77.8 | red color |

TABLE 3-continued

| Disazo Compound No. | Coupler | Yield (%) | Appearance |
|---|---|---|---|
| 19 | HO-, CONH-C6H4-Cl (2-hydroxy-3-naphthoic acid 4-chloroanilide) | 84.1 | reddish orange color |
| 2 | HO-, CONH-C6H4-NO2 (2-hydroxy-3-naphthoic acid 2-nitroanilide) | 70.4 | red color |
| 3 | HO-, CONH-C6H4-NO2 (2-hydroxy-3-naphthoic acid 3-nitroanilide) | 64.8 | reddish orange color |
| 4 | HO-, CONH-C6H4-NO2 (2-hydroxy-3-naphthoic acid 4-nitroanilide) | 62.0 | red color |
| 121 | HO-, CONH-Ph, with fused HN-indole (carbazole-type coupler) | 86.0 | purplish black color |

TABLE 3-continued

| Disazo Compound No. | Coupler | Yield (%) | Appearance |
|---|---|---|---|
| 164 | HO, CONHN=CH—(structure: phenyl attached to CH=N-NHCO, with HO and CONHN=CH substituents on a naphthalene ring) | 73.5 | reddish orange color |

Figure 11:
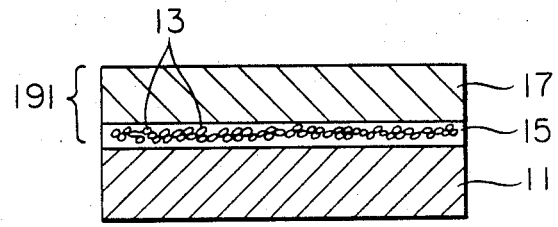
FIGS. 11 and 12 are enlarged sectional views showing a structure example of the electrophotographic element of the present invention.
Figure 12:
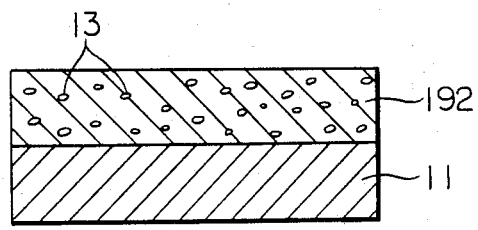

The disazo pigment of the present invention is used as a charge generating material in a photosensitive layer of an electrophotographic element. FIGS. 11 and 12 illustrate a typical structure of the electrophotographic element.

The electrophotographic element of FIG. 11 comprises a laminated type photosensitive layer 191 on an electroconductive substrate 11, said photosensitive layer 191 comprising a charge generating layer 15 containing disazo pigment 13 as the main component and a charge transfer layer 17 containing charge transfer material as the main component.

In the electrophotographic element of FIG. 11, exposed light passes through a charge transfer layer to a charge generating layer 15 wherein a charge is generated in disazo pigment 13. The charge thus generated is then transferred by the charge transfer layer 17. Thus, the generation of the charge necessary for light decay is effected in the disazo pigment 13, and the transfer of the generated charge is effected by the charge transfer layer 17.

The electrophotographic element shown in FIG. 12 is composed of a photosensitive layer 192 on an electroconductive substrate 11, the photosensitive layer 192 consisting essentially of disazo pigment 13, charge transfer material and insulative binder. The disazo pigment 13 is a charge generating material.

It is possible to modify the basic structure of the electrophotographic element of FIG. 11, for example, by applying the charge generating layer and the charge transfer layer in reverse order.

The thickness of the charge generating layer 15 of the photosensitive layer of FIG. 11 is preferably 0.01–5$\mu$, more preferably 0.05–2$\mu$. If this thickness is less than 0.01$\mu$, the generation of charge is not satisfactory. On the other hand, if this thickness is more than 5$\mu$, the residual potential becomes too high for practical use.

The thickness of the charge transfer layer 17 is preferably 3–50$\mu$, more preferably 5–20$\mu$. If this thickness is less than 3$\mu$, a charged amount is insufficient. On the other hand, if this thickness is more than 50$\mu$, the residual potential becomes too high for practical use.

The charge generating layer 15 contains disazo pigment expressed by the above general formula as the main component, binder, plasticizer and the like. The amount of disazo pigment in the charge generating layer is more than 30% by weight, more preferably 50% by weight.

The charge transfer layer 17 contains charge transfer material and binder as the main components and plasticizer and the like. The amount of the charge transfer material in the charge transfer layer is 10–95% by weight, preferably 30–90% by weight. If the amount of the charge transfer material is less than 10% by weight, the transfer of the charge is not substantially carried out. On the other hand, if this amount is more than 95% by weight, the mechanical strength of the photosensitive film is too low for practical use.

The photosensitive layer 192 of the photosensitive element of FIG. 12 is preferably 3–50$\mu$, more preferably 5–20$\mu$. The amount of the disazo pigment in the photosensitive layer 192 is preferably less than 50% by weight, more preferably less than 20% by weight, and the amount of the charge transfer material is preferably 10–95% by weight, more preferably 30–90% by weight.

The essential feature of the present invention resides in the use of specific disazo pigments as expressed by the above general formula (I) or (I)' and other components such as electroconductive substrate, charge transfer material and the like are the same as the conventionally known materials. Examples of these materials are illustrated hereinafter.

Examples of the electroconductive substrate used in the electrophotographic element of the present invention include: metallic plates such as aluminum, copper, zinc and the like; plastic sheets such as polyester and the like; plastic film composite obtained by vapor depositing electroconductive materials such as aluminum, $SnO_2$ and the like on a plastic film; or electroconductively treated paper and the like.

Examples of binders include: condensation type resins such as polyamide, polyurethane, polyester, epoxy resin, polyketone, polycarbonate and the like; vinyl polymers such as polyvinyl ketone, polystyrene, poly-N-vinyl carbazole, polyacrylamide, and the like. Any resin can be used if it is insulative and adhesive.

Examples of plasticizers include halogenated paraffin, polybiphenylchloride, dimethylnaphthalene, dibutyl phthalate and the like. Silicone oil may also be added to improve surface properties of the photosensitive material.

The charge transfer material includes a positive hole transfer material and an electron transfer material. Examples of the hole transfer material include compounds as expressed by the following general formulas (a) to (k).

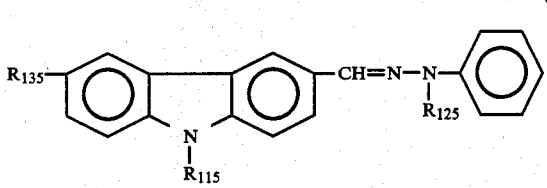
(a)

(wherein $R_{115}$ represents methyl, ethyl, 2-hydroxyethyl or 2-chloroethyl; $R_{125}$ represents methyl, ethyl, benzyl or phenyl; and $R_{135}$ represents hydrogen, chlorine, bromine, alkyl having 1 to 4 carbon atoms, alkoxy having 1 to 4 carbon atoms, dialkylamino or nitro.)

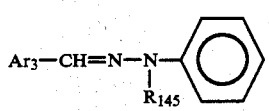
(b)

(wherein $Ar_3$ represents naphthalene ring, anthracene ring, styryl group and their substituents or pyridine ring, furan ring, or thiophene ring; and $R_{145}$ represents alkyl or benzyl group.)

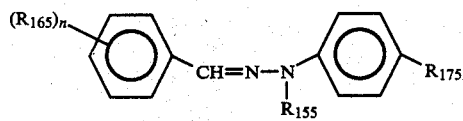
(c)

(wherein $R_{155}$ represents alkyl, benzyl, phenyl or naphthyl group; $R_{165}$ represents hydrogen, alkyl having 1 to 3 carbon atoms, alkoxy having 1 to 3 carbon atoms, dialkylamino, diaralkylamino or diarylamino group; n represents an integer of 1 to 4; when n is 2 or more, $R_{165}$ may be the same or different; and $R_{175}$ represents hydrogen or methoxy group.)

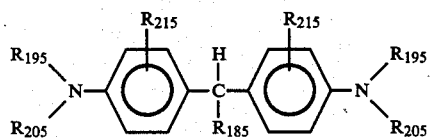
(d)

(wherein $R_{185}$ represents alkyl having 1 to 11 carbon atoms, substituted or non-substituted phenyl or heterocyclic group; $R_{195}$ and $R_{205}$ may be the same or different and represent hyrogen, alkyl having 1 to 4 carbon atoms, hydroxyalkyl, chloroalkyl, substituted or non-substituted aralkyl; $R_{195}$ and $R_{205}$ may be bonded with each other to form a heterocyclic ring containing nitrogen; $R_{215}$ may be the same or different and represents hydrogen, alkyl having 1 to 4 carbon atoms, alkoxy or halogen.)

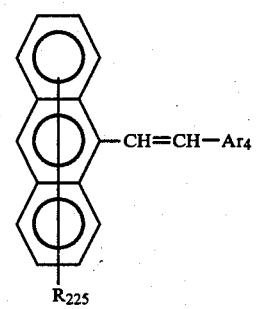
(e)

(wherein $R_{225}$ represents hydrogen or a halogen atom; and $Ar_4$ represents substituted or non-substituted phenyl, naphthyl, anthryl or carbazolyl.)

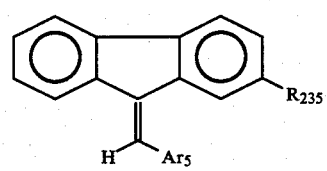
(f)

(wherein $R_{235}$ represents hydrogen, halogen, cyano, alkoxy having 1 to 4 carbon atoms or alkyl having 1 to 4 carbon atoms; $Ar_5$ represents

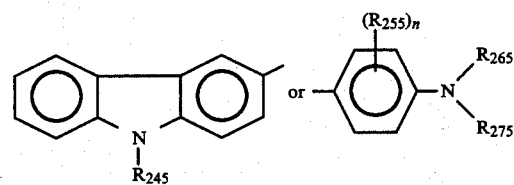

wherein $R_{245}$ represents alkyl having 1 to 4 carbon atoms, $R_{255}$ represents hydrogen, halogen, alkyl having 1 to 4 carbn atoms, alkoxy having 1 to 4 carbon atoms or dialkyl amino, n is an integer of 1 or 2; when n is 2, $R_{255}$ may be the same or different; $R_{265}$ and $R_{275}$ represent hydrogen, substituted or non-substituted alkyl having 1 to 4 carbon atoms or substituted or non-substituted benzyl group.)

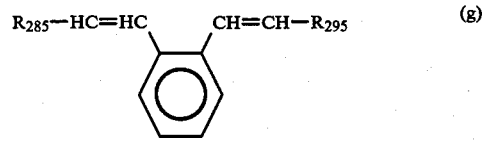
(g)

(wherein $R_{285}$ and $R_{295}$ represents carbazolyl, pyridyl, thienyl, indolyl, furyl, or substituted or non-substituted phenyl styryl, naphthyl or anthryl groups; these substituents are selected from the group consisting of dialkylamino, alkyl, alkoxy, carboxyl or its ester, halogen atom, cyano, aralkylamino, N-alkyl-N-aralkylamino, amino, nitro and acetyl amino groups.)

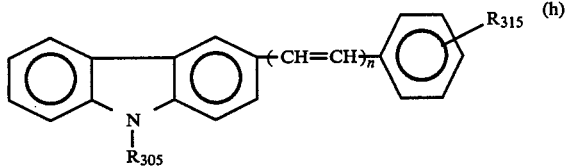

(wherein R₃₀₅ represents a lower alkyl or benzyl group; R₃₁₅ represents hydrogen, lower alkyl, lower alkoxy, halogen, nitro, amino, or amino group having a lower alkyl or benzyl substituent; and n is an integer of 1 or 2.)

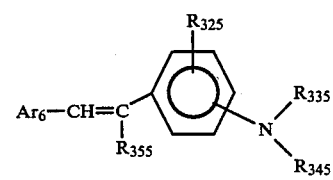

(wherein R₃₂₅ represents hydrogen, alkyl, alkoxy or halogen; R₃₃₅ and R₃₄₅ represent alkyl, substituted or non-substituted aralkyl, or substituted or non-substituted aryl group; R₃₅₅ represents hydrogen or substituted or non-substituted phenyl; and Ar₆ represents phenyl or naphthyl group.)

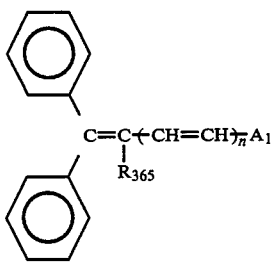

(wherein n is an integer of 0 or 1; R₃₆₅ represents hydrogen, alkyl or substituted or non-substituted phenyl; A₁ represents

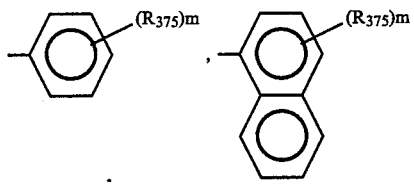

9-anthryl, or substituted or non-substituted N-alkylcarbazolyl group, wherein R₃₇₅ represents hydrogen, alkyl, alkoxy, halogen or

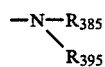

wherein R₃₈₅ and R₃₉₅ represent alkyl, substituted or non-substituted aralkyl, or substituted or non-substituted aryl group, and R₃₈₅ and R₃₉₅ may form a ring; and m is an integer of 0, 1, 2 or 3, when m is 2 or more, R₃₇₅ may be the same or different.)

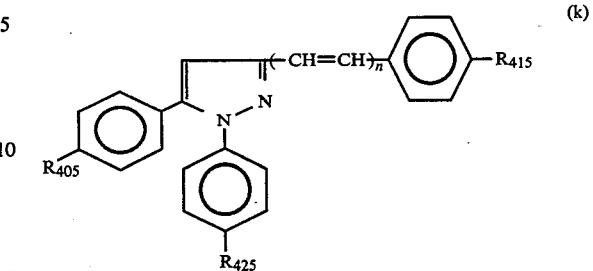

(wherein R₄₀₅, R₄₁₅ and R₄₂₅ are hydrogen, lower alkyl, lower alkoxy, dialkylamino, or halogen; and n is 0 or 1.)

Examples of the compounds expressed by the general formula (a) include: 9-ethylcarbazole-3-aldehyde-1-methyl-1-phenylhydrazone, 9-ethylcarbazole-3-aldehyde-1-benzyl-1-phenylhydrazone, 9-ethylcarbazole-3-aldehyde 1,1-diphenylhydrazone, and the like.

Examples of the compounds expressed by the general formula (b) include: 4-diethylaminostyrene-β-aldehyde-1-methyl-1-phenylhydrazone, 4-methoxynaphthalene-1-aldehyde-1-benzyl-1-phenylhydrazone, and the like.

Examples of the compound expressed by the general formula (c) include: 4-methoxybenzaldehyde 1-methyl-1-phenylhydrazone, 2,4-dimethoxybenzaldehyde 1-benzyl-1-phenylhydrazone, 4-diethylaminobenzaldehyde 1,1-diphenylhydrazone, 4-methoxybenzaldehyde 1-benzyl-1-(4-methoxy)phenyl hydrazone, 4-diphenylaminobenzaldehyde-1-benzyl-1-phenylhydrazone, 4-dibenzylaminobenzaldehyde 1,1-diphenylhydrazone and the like.

Examples of the compound expressed by the general formula (d) include: 1,1-bis(4-dibenzylaminophenyl)-propane, tris(4-diethylaminophenyl)methane, 1,1-bis(4-dibenzylaminophenyl)propane, 2,2'-dimethyl-4,4'-bis(diethylamino)-triphenylmethane and the like.

Examples of the compound expressed by the general formula (e) include: 9-(4-diethylaminostyryl)anthracene, 9-bromo-10-(4-diethylaminostyryl)anthracene, and the like.

Examples of the compound expressed by the general formula (f) include: 9-(4-dimethylaminobenzylidene)-fluorene, 3-(9-fluorenylidene)-9-ethylcarbazole, and the like.

Examples of the compound expressed by the general formula (g) include: 1,2-bis(4-diethylaminostyryl)benzene, 1,2-bis(2,4-dimethoxystyryl)benzene and the like.

Examples of the compound expressed by the general formula (h) include: 3-styryl-9-ethylcarbazole, 3-(4-methoxystyryl)-9-ethylcarbazole, and the like.

Examples of the compounds expressed by the general formula (i) include: 4-diphenylaminostilbene, 4-dibenzylaminostilbene, 4-ditolylaminostilbene, 1-(4-diphenylaminostyryl)naphthalene, 1-(4-diethylaminostyryl)naphthylene, and the like.

Examples of the compounds expressed by the general formula (j) include: 4'-diphenylamino-alpha-phenylstilbene, 4'-methylphenylamino-alpha-phenylstilbene, and the like.

Examples of the compounds expressed by the general formula (k) include: 1-phenyl-3-(4-diethylaminostyryl)-5-(4-diethylaminophenyl)pyrazoline, 1-phenyl-3-(4-dimethylaminostyryl)-5-(4-dimethylaminophenyl)-pyrazoline, and the like.

Other examples of a positive hole transfer material include: oxadiazole compounds such as 2,5-bis(4-diethylaminophenyl)-1,3,4-oxadiazole, 2,5-bis(4-(4-diethylaminostyryl)phenyl)-1,3,4-oxadiazole, 2-(9-ethylcarbazolyl-3)-5-(4-diethylaminophenyl)-1,3,4-oxadiazole, and the like; low molecular oxazole compounds such as 2-vinyl-4-(2-chlorophenyl)-5-(4-diethylaminophenyl)-oxazole, 2-(4-diethylaminophenyl)-4-phenyloxazole, and the like; and high molecular compounds such as poly-N-vinyl carbazole, halogenated poly-N-vinyl carbazole, polyvinyl pyrene, polyvinyl anthracene, pyrene formaldehyde resin, ethylcarbazole formaldehyde resin, and the like.

Examples of the electron transfer material include: chloroanil, bromoanil, tetracyanoethylene, tetracyanoquinonedimethane, 2,4,7-trinitro-9-fluorenone, 2,4,5,7-tetranitro-9-fluorenone, 2,4,5,7-tetranitroxanthone, 2,4,8-trinitro-thioxanthone, 2,6,8-trinitro-4H-indeno(1,2-b)-thiophen-4-on, 1,3,7-trinitrodibenzothiophene-5,5-dioxide, and the like.

These charge transfer materials are used alone or in the form of a mixture of two or more.

With regard to the electrophotographic elements as prepared above, an adhesive layer or barrier layer may optionally be applied between an electroconductive substrate and a photosensitive layer. Examples of these layers include polyamide, nitrocellulose, aluminum oxide and the like. The thickness of the layer is preferably not more than 1μ.

The electrophotographic element as shown in FIG. 11 is prepared by vapor-depositing disazo pigment on an electroconductive substrate in accordance with vacuum vapor depositing method as disclosed in U.S. Pat. Nos. 3,973,959 and 3,996,049 or by coating and drying on an electroconductive substrate a dispersion of disazo pigment particles in an appropriate solvent optionally having a binder dissolved therein; and then coating and drying a solution containing charge transfer material and binder on the charge generating layer, the surface of which may optionally be subjected to a buff polishing as disclosed in Japanese Patent Laid Open No. 51-90827, or the thickness of which may be regulated, before being coated with charge transfer material.

The electrophotographic element as shown in FIG. 12 is prepared by dispersing disazo pigment particles in a solution having charge transfer material and binder dissolved therein, coating the dispersion on an electroconductive substrate and drying. In any case, disazo pigment used in the present invention is powdered by a ball mill or the like to a particle size of not more than 5μ, preferably not more than 2μ. Coating can be effected by ordinary method by means of a doctor blade, dipping, wire bar and the like.

Copying by the electrophotographic element of the present invention can be effected by developing, after charging and exposing the photosensitive layer surface and, if necessary, transferring the developed image to paper and the like.

As clearly seen from the above description and the following Examples, in comparison with the conventional electrophotographic elements, the electrophotographic element of the present invention using the disazo pigments having the benzophenone structure as a charge generating material can be more easily produced and has a higher sensitivity, the photosensitive wavelength zone of which lies in a shorter wavelength side (about 450–600 nm). In addition to this advantage, the performances of the electrophotographic element of the present invention are stable even if it is repeatedly used a great number of times.

The present invention is further illustrated by the following Examples 11 to 19, but the present invention should not be limited thereto.

EXAMPLE 11

76 parts by weight of disazo pigment No. 164, 1260 parts by weight of tetrahydrofuran solution (solid content=2%) of polyester resin ("Byron 200" manufactured by Toyo Boseki Ltd.), and 3700 parts by weight of tetrahydrofuran are powdered and mixed in a ball mill. The dispersion thus obtained was coated on an aluminum surface of an aluminum-deposited polyester base (electroconductive substrate) by a doctor blade, and the coated film was allowed to stand for drying, thereby forming a charge generating layer having a thickness of about 1 μm.

On this charge generating layer was coated a solution prepared by dissolving and mixing 2 parts by weight of 9-ethylcarbazole-3-aldehyde 1-methyl-1-phenylhydrazone, 2 parts by weight of polycarbonate resin ("Panlight K-1300" manufactured by Teijin Co., Ltd.) and 16 parts by weight of tetrahydrofuran by a doctor blade. The coated film was dried at 80° C. for 2 minutes and 105° C. for 5 minutes, thereby forming a charge transfer layer having a thickness of about 20 μm. The laminated type electrophototographic element No. 1 thus prepared is shown in FIG. 11.

EXAMPLE 12

Electrophotographic element No. 2 was prepared in the same manner as in Example 11, except that the disazo pigment as shown in the following Table 4 was used in place of the disazo pigment No. 164 used in Example 11.

EXAMPLES 13 to 15

Electrophotographic elements Nos. 3 to 5 were prepared in the same manner as in Example 11, except that 1-phenyl-3-(4-diethylaminostyryl)-5-(4-diethylaminophenyl)pyrazoline was used as a charge transfer material and the disazo pigments as shown in the following Table 5 were used.

EXAMPLES 16 to 18

Electrophotographic elements Nos. 6 to 8 were prepared in the same manner as in Example 11, except that 4'-diphenylamino-alpha-phenylstilbene was used as a charge transfer material and the disazo pigments as shown in the following Table 6 were used.

EXAMPLE 19

Electrophotographic element No. 9 was prepared in the same manner as in Example 11, except that 1,1-bis(4-dibenzyl amino phenyl)propane was used as a charge transfer material and the disazo pigment as shown in the following Table 7 was used.

The electrophotographic elements Nos. 1 to 9 thus prepared were subjected to −6 KV corona discharge for 20 seconds by an electrostatic copying paper tester (SP-428 Type produced by Kawaguchi Denki Works), and were charged negatively. Thereafter, these elements were left to stand in the dark for 20 seconds to measure the surface potential Vpo (V) at that time, and were exposed to radiation of a tungsten lamp so that the intensity of surface illumination may become 4.5 Lux. Then, the time (sec.) required until the surface potential was reduced to ½ of Vpo was measured, and the exposure amount E1/2 (Lux-sec) was calculated. The results thus obtained are shown in Tables 4 to 7.

TABLE 4

| Photo-sensitive Material No. | Disazo Compound No. | Vpo (volt) | E½ (lux · sec) |
|---|---|---|---|
| 1 | 164 | −1100 | 10.4 |
| 2 | 2 | −1384 | 3.8 |

TABLE 5

| Photo-sensitive Material No. | Disazo Compound No. | Vpo (volt) | E½ (lux · sec) |
|---|---|---|---|
| 3 | 164 | −692 | 10.3 |
| 4 | 121 | −1184 | 4.7 |
| 5 | 2 | −966 | 3.8 |

TABLE 6

| Photo-sensitive Material No. | Disazo Compound No. | Vpo (volt) | E½ (lux · sec) |
|---|---|---|---|
| 6 | 2 | −1336 | 4.3 |
| 7 | 3 | −858 | 6.8 |
| 8 | 4 | −776 | 2.5 |

TABLE 7

| Photo-sensitive Material No. | Disazo Compound No. | Vpo (volt) | E½ (lux · sec) |
|---|---|---|---|
| 9 | 2 | −1512 | 6.8 |

In order to make comparisons, Comparative Electrophotographic Elements A ad B were prepared in the same manner as in the above Example 11, except that the disazo compound of the present invention was replaced by (a) 4,4'-bis(2-hydroxy-3-phenylcarbamoyl-1-naphthylazo)-3,3'-dichlorodiphenyl (benzidine type disazo compounds as disclosed in Japanese Patent Laid Open Nos. 45-37543 and 52-55643) and (b) 4,4'-bis(2-hydroxy-3-phenylcarbamoyl-1-naphthylazo)stilbene (stilbene type disazo compounds as disclosed in Japanese Patent Laid Open No. 52-8832).

With regard to the Comparative Electrophotographic Elements A and B thus prepared and Electrophotographic Element No. 8 of the present invention, their electrostatic properties were measured using the above mentioned commercially available electrostatic copying paper tester (SP-428 Type produced by Kawaguchi Denki Works). That is, as mentioned above, the electrophotographic elements were subjected to −6 KV corona discharge for 20 seconds, and were charged negatively. Then the surface potential Vdo (volt) at the time was measured. Thereafter, these elements were left to stand in the dark for decaying for 20 seconds to measure the surface potential Vpo (volt) at that time and were exposed to the radiation of a tungsten lamp so that the illuminance became 20 Lux. Then, the time (sec.) required until the surface potential was reduced to ½ of Vpo was measured, and the exposure amount E1/2 (Lux-sec) was calculated. In the same manner as above, the exposure amounts E1/5 (Lux-sec) and E1/10 (Lux-sec) were measured. The results thus obtained are shown in Table 8.

TABLE 8

| Photo-sensitive Material | Vdo (volt) | Vpo (volt) | Vpo/Vdo | E ½ (lux · sec) | E 1/5 (lux · sec) | E 1/10 (lux · sec) |
|---|---|---|---|---|---|---|
| No. 8 (this invention) | −1240 | −776 | 0.63 | 2.5 | 4.7 | 6.1 |
| Comparative Example A | −940 | −693 | 0.738 | 5.9 | 12.3 | 16.7 |
| Comparative Example B | −1817 | −1501 | 0.826 | 19.3 | 51.0 | 75.0 |

As can be seen from the data shown in the above Tables 4 to 8, the photosensitive material of the present invention has a much higher sensitivity in comparison with the comparative photosensitive materials (A) and (B) using the conventional disazo compounds.

The spectral sensitivity of the photosensitive material No. 8 of the present invention was measured in the following manner.

The photosensitive material was charged in the dark by corona discharge until the surface potential exceeded −800 Volt and the charged photosensitive material was subjected to dark decay until the surface potential became −800 Volt. When the surface potential became −800 Volt, the photosensitive material was irradiated with a monochromic light of 1 $\mu W/cm^2$ separated by a monochromator. Then, the time (sec.) required until the surface potential was reduced to half of the initial value, i.e. −400 V was measured to calculate "half exposure amount" ($\mu W\text{-sec}/cm^2$). A potential reduction value by dark decay was subtracted from the above apparent potential reduction amount (400 V) to obtain the actual surface potential amount reduced by the light-exposure. Thus, the sensitivity of the photosensitive material expressed by potential decay speed by light (Volt-$cm^2$-$\mu W^{-1}$-$sec^{-1}$) was calculated. The spectral sensitivity curve thus obtained is shown in FIG. 13.

Figure 13:
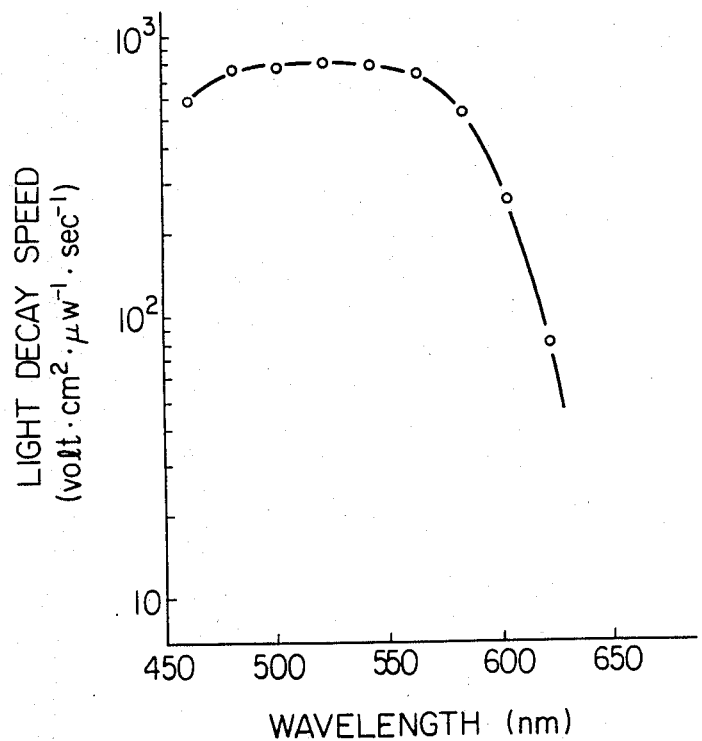
FIG. 13 shows the spectral sensitivity curve of the photosensitive material of the present invention.

As can be seen from FIG. 13, the photosensitive material No. 8 using the disazo compound of the present invention has a photosensitive wave length zone lying in about 450–600 nm, thus having a good image-reproducibility of a reddish original.

The photosensitive materials Nos. 6 and 8 of the present invention were set in an electrophotographic copying machine (Ricopy-P-500 Type produced by RICOH K.K.), and image-formation was repeated 10,000 times. Each photosensitive material formed a stable clear-cut image regardless of the numerous repetition of image-formation. It should be understood from these results that the photosensitive materials of the present invention are excellent also in durability.

What we claim is:

1. A photosensitive material for use in electrophotography, comprising an electroconductive substrate and a photosensitive layer on said substrate, said photosensitive layer comprising a charge generating material and a charge transfer material, said charge generating material being a disazo pigment of the formula,

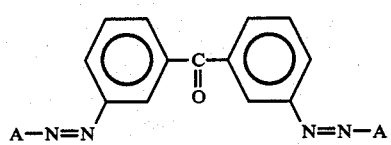

wherein A represents a coupler residue.

2. The photosensitive material as claimed in claim 1, wherein said coupler residue A has the general formula (VII), (VIII), (IX), (X), (XI), (XII), (XIII), (XIV) or (XV),

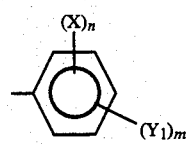
(VII)

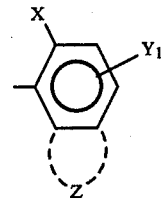
(VIII)

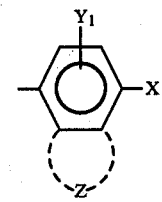
(IX)

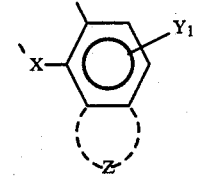
(X)

wherein X, $Y_1$, Z, m and n in the above formulas (VII), (VIII), (IX) and (X) represent the following:

X: —OH,

or —NHSO$_2$—R$_3$ wherein R$_1$ and R$_2$ represent hydrogen, substituted alkyl group or non-substituted alkyl group, and R$_3$ represents a substituted alkyl group, non-substituted alkyl group, substituted aryl group or non-substituted aryl group;

Y$_1$: hydrogen, halogen, substituted alkyl group, non-substituted alkyl group, substituted alkoxy group, non-substituted alkoxy group, carboxyl group, sulfo group, substituted sulfamoyl group, non-substituted sulfamoyl group or

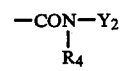

where R$_4$ represents hydrogen, alkyl group, substituted alkyl group, phenyl group or substituted phenyl group, and Y$_2$ represents cyclic hydrocarbon group, substituted cyclic hydrocarbon group, heterocyclic group, substituted heterocyclic group, or

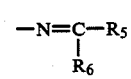

wherein R$_5$ represents a cyclic hydrocarbon group, substituted cyclic hydrocarbon group, heterocyclic group, substituted heterocyclic group, styryl group or substituted styryl group, and R$_6$ represents hydrogen, alkyl group, substituted alkyl group, phenyl group or substituted phenyl group, or $R_5$ and $R_6$ form a ring with the carbon atom bonded thereto;

Z: cyclic hydrocarbon group, substituted cyclic hydrocarbon group, heterocyclic group or substituted heterocyclic group;

n: an integer of 1 or 2;

m: an integer of 1 or 2;

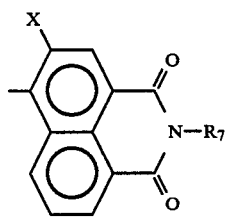
(XI)

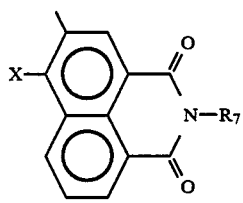
(XII)

wherein $R_7$ in the above formulas (XI) and (XII) represents a substituted hydrocarbonyl group or non-substituted hydrocarbonyl group, and X is the same as defined above,

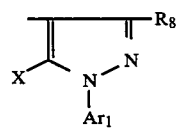

wherein $R_8$ represents an alkyl group, carbamoyl group, carboxyl group or its ester, and $Ar_1$ represents a cyclic hydrocarbon group or substituted cyclic hydrocarbon group, and X is the same as defined above,

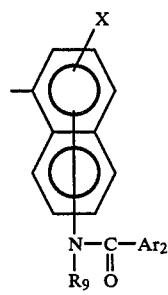
(XIV)

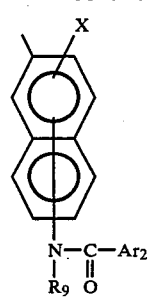
(XV)

where $R_9$ in the above formulas (XIV) and (XV) represents hydrogen, substituted hydrocarbonyl group or non-substituted hydrocarbonyl group, and $Ar_2$ represents cyclic hydrocarbon group or substituted cyclic hydrocarbon group.

3. The photosensitive material as claimed in claim 2 wherein said coupler residue A has the above general formula (VIII), (XI), (XII), (XIII), (XIV) or (XV), and X is hydroxyl group.

4. The photosensitive material as claimed in claim 2, wherein said coupler residue A has the general formula (XVI),

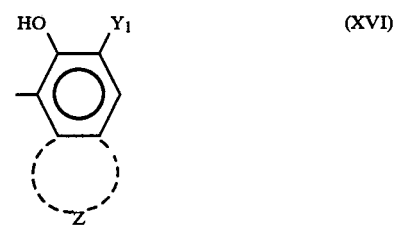
(XVI)

wherein $Y_1$ and Z are the same as mentioned above.

5. The photosensitive material as claimed in claim 2, wherein said coupler residue A has the general formula (XVII),

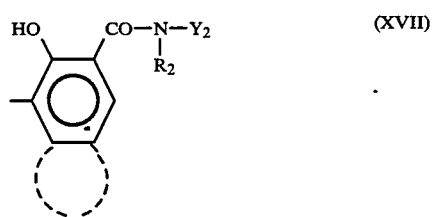
(XVII)

where Z, $Y_2$ and $R_2$ are the same as mentioned above.

6. The photosensitive material as claimed in claim 2, wherein said coupler residue A has the general formula (XVIII) or (XIX),

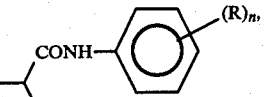

(XVIII)

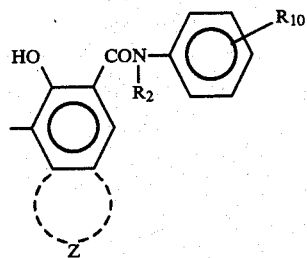

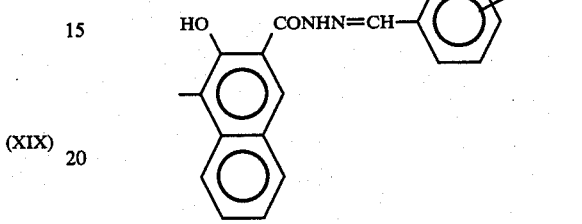

(XIX)

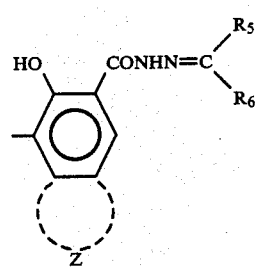

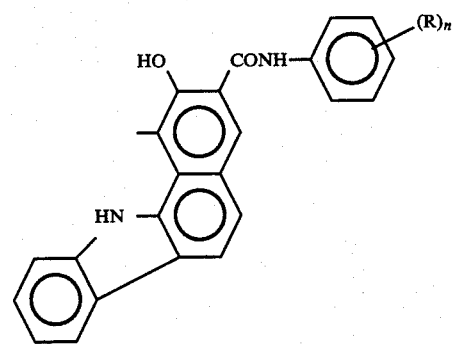

wherein Z, $R_2$, $R_5$ and $R_6$ are the same as mentioned above, and $R_{10}$ represents a substituent as defined in $Y_2$.

7. The photosensitive material as claimed in claim 1, wherein said coupler residue A has the general formula, wherein R represents an alkyl, alkoxy, nitro, halogen, cyano or halomethyl group; n represents an integer of 0, 1, 2 or 3; and R may be the same or different when n is an integer of 2 or 3.

* * * * *